United States Patent

Goto et al.

[11] Patent Number: 5,758,213
[45] Date of Patent: May 26, 1998

[54] CAMERA HAVING A SHUTTER MEASURING APPARATUS

[75] Inventors: Tetsuro Goto, Funabashi; Masanori Hasuda, Yokohama; Akira Katayama, Koganei, all of Japan

[73] Assignee: Nikon Corporation, Tokyo, Japan

[21] Appl. No.: 178,850

[22] Filed: Jan. 7, 1994

[30] Foreign Application Priority Data

Jan. 11, 1993 [JP] Japan ................. 5-002231

[51] Int. Cl.$^6$ ............................................. G03B 9/08
[52] U.S. Cl. ........................... 396/235; 396/452; 396/463
[58] Field of Search ........................... 354/432, 439, 354/241–249; 396/452, 463, 479, 480, 481, 482, 483, 484, 488, 489, 235

[56] References Cited

U.S. PATENT DOCUMENTS 4,325,614  4/1982  Grimes ........................... 354/247
5,014,082  5/1991  Farrington ...................... 354/437
5,457,514  10/1995  Hasuda et al. ................. 354/246

FOREIGN PATENT DOCUMENTS 5-34765  2/1993  Japan .

Primary Examiner—David M. Gray

[57] ABSTRACT

A shutter of a camera is provided with a shutter trip detecting device includes LEDs and PTRs. Measured are tripping timings of leading and trailing curtains for admitting and intercepting object light to an aperture. An exposure time on a film and a tripping time (curtain velocity) of each curtain are thus detected. The detected result is compared with a fiducial value, and an alarm is given according to the need. There are detected mechanical fluctuation elements relative to the shutter, e.g., a scatter of the exposure time on the film, a partial unevenness of the exposure time and an influence on the exposure time due to a fault in a driving mechanism. The alarm can be thus given to the user, and an automatic adjustment can be made. The shutter trip detecting device includes the shutter leading/trailing curtains, the LEDs and PTRs which detect tripping thereof.

14 Claims, 31 Drawing Sheets

CAMERA HAVING A SHUTTER MEASURING APPARATUS

BACKGROUND OF THE INVENTION

1. Field of the Invention

The present invention relates to an apparatus, employed for a camera, for detecting a tripping state of a shutter.

2. Related Background Art

According to conventional cameras, a beam of light from an object is restricted by a stop of a lens. Further, an exposure time on a film is also regulated by a mechanical shutter.

The shutter employed particularly in a single-lens reflex camera is basically constructed of two curtains, i.e., leading and trailing curtains. Before an exposure, the leading curtain covers an exposure picture of the film. When depressing a shutter button from this state, the leading curtain at first moves away from the picture, thus starting the exposure on the film picture. Then, after a predetermined time has elapsed, the trailing curtain works to cover the film picture. Each curtain is tripped by a mechanical biasing force of a spring. The curtain starts tripping with a release of mechanical securing thereof.

These actions were purely mechanically controlled in the past. In recent years, however, a widely used practice has been electrical control. The leading and trailing curtains themselves are tripped by the spring force as in the past. The start of tripping is controlled by electrifying an electromagnet for securing the shutter curtain.

Further, specifications thereof go such that an emphasis is to speed up the shutter as high as 1/8000 sec. At the same time, electronic flashes have been also widely employed of late. It is required that a flash sync speed of the shutter be increased to make possible the photography involving stroboscopic flashing in a bright environment.

For this purpose, there is nothing but to remarkably increase the tripping velocity (hereinafter termed a curtain velocity) of each curtain by enhancing the above spring force and, besides, to perform the control to narrow a slit width configured by the leading and trailing curtains.

As explained above, the start of tripping thereof is electrically controlled. The shutter having a high curtain velocity but a narrow slit width exhibits a possibility to induce the following problems.

The actual exposure time has to depend on a mechanical tripping state of each curtain even by accurately controlling the exposure time at an electrifying control timing of the electromagnet. Fluctuation elements in terms of the actual exposure may include a separation velocity of the securing mechanism from the electromagnet and a scatter in the mechanical tripping system inclusive of the spring. Further, these elements inevitably exhibit temperature characteristics and fluctuation characteristics relative to a change with a passage of time. Hence, a total quantity of variations differs in many ways.

This phenomenon becomes further conspicuous when increasing the tripping velocity.

The following phenomena are examples of abnormal states. A desired shutter speed is not obtained. As a result, the quantity of exposure on the film surface lacks. In an extreme case, the curtains are tripped while being overlapped with each other, with the result that the exposure is not effected at all. Reversely, the curtains are not closed, resulting in such a possibility that an overexposure is caused. A further problem is that the drawback can not be detected unless the film is developed because any phenomena described above are not detected during the photography.

SUMMARY OF THE INVENTION

It is a primary object of the present invention to obviate the above problems by providing a shutter element with an operating state detecting element.

To accomplish the above object, according to one aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating a light intercepting state of intercepting the transmission of the photographing light through the aperture portion and a transmitting state of admitting the transmission thereof. The shutter measuring apparatus also comprises a shutter control element for controlling the operation of the shutter element and a shutter driving element for driving the shutter element. The shutter measuring apparatus further comprises a shutter detecting element for detecting an operating state of the shutter element.

To accomplish the above object, according to another aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating a light intercepting state of intercepting the transmission of the photographing light through the aperture portion and the transmitting state of admitting the transmission thereof. The shutter measuring apparatus also comprises first and second shutter control elements for controlling the operations of the shutter element and a selecting element for selecting any one of the first and second shutter control elements. The shutter measuring apparatus further comprises a first shutter driving element for driving the shutter element in accordance with the control by the first shutter control element and a second shutter driving element for driving the shutter element in accordance with the control by the second shutter control element. The shutter measuring apparatus still further comprises a shutter detecting element for detecting an operating state of the shutter element through the second shutter driving element.

To accomplish the above object, according to still another aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating the light intercepting state of intercepting the transmission of the photographing light through the aperture portion and the transmitting state of admitting the transmission thereof. The shutter measuring apparatus also comprises a shutter control element for controlling an operation of the shutter element and a shutter driving element for driving the shutter element in accordance with the control by the shutter control element. The shutter measuring apparatus further comprises a shutter detecting element for detecting an operating state of the shutter element and a condition-of-use detecting element for detecting a condition of use of the camera. The shutter measuring apparatus still further comprises a detection control element for making the shutter detecting element active in accordance with an output of the condition-of-use detecting element.

To accomplish the above object, according to a further aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating a light intercepting state of intercepting the transmission of the photographing light through the aperture portion and a transmitting state of admitting the transmission thereof. The shutter measuring apparatus also comprises a shutter control element for controlling an operation of the shutter element and a shutter driving element for driving the shutter element in accordance with the control by the shutter control element. The shutter measuring apparatus further comprises a photo detecting element for detecting an operating state of the shutter with the object light serving as a light source.

To accomplish the above object, according to a still further aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating a light intercepting state of intercepting the transmission of the photographing light through the aperture portion and a transmitting state of admitting the transmission thereof. The shutter measuring apparatus also comprises a shutter control element for controlling an operation of the shutter element and a shutter driving element for driving the shutter element in accordance with the control by the shutter control element. The shutter measuring apparatus further comprises a photo detecting element for detecting an operating state of the shutter with the object light serving as a light source and a shutter detecting element for detecting an operating state of the shutter element with a variable detected photographic speed.

To accomplish the above object, according to a yet further aspect of the present invention, there is provided a camera having a shutter measuring apparatus. The shutter measuring apparatus has an aperture portion which admits a transmission of photographing light to a recording medium loaded in the camera. The shutter measuring apparatus comprises a shutter element capable of operating a light intercepting state of intercepting the transmission of the photographing light through the aperture portion and a transmitting state of admitting the transmission thereof. The shutter measuring apparatus also comprises a shutter control element for controlling an operation of the shutter element and a shutter driving element for driving the shutter element in accordance with the control by the shutter control element. The shutter measuring apparatus further comprises a shutter detecting element for detecting an operating state of the shutter element and outputting an operating state in the form of a pulse signal and a storage element for storing the pulse signal as an analog-converted signal.

According to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the shutter control element for controlling the operation of the shutter element and the shutter driving element for driving the shutter element. The shutter measuring apparatus further comprises the shutter detecting element for detecting the operating state of the shutter element. It is therefore possible to detect the operating state of the shutter.

Further, according to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the first and second shutter control elements for controlling the operations of the shutter element and the selecting element for selecting any one of the first and second shutter control elements. The shutter measuring apparatus further comprises the first shutter driving element for driving the shutter element in accordance with the control by the first shutter control element and the second shutter driving element for driving the shutter element in accordance with the control by the second shutter control element. The shutter measuring apparatus still further comprises the shutter detecting element for detecting the operating state of the shutter element through the second shutter driving element. Accordingly, there is no need for operating the camera absolutely in the same sequence as that of the normal photography when detecting the operating state of the shutter.

Moreover, according to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the shutter detecting element for detecting the operating state of the shutter element and the condition-of-use detecting element for detecting a condition of use of the camera. The shutter measuring apparatus still further comprises the detection control element for making the shutter detecting element active in accordance with the output of the condition-of-use detecting element. Therefore, the detection of the operating state of the shutter does not get active each time shooting takes place. The detection is executed when reaching the predetermined condition of use.

Furthermore, according to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the photo detecting element for detecting the operating state of the shutter with the object light serving as a light source. Hence, this eliminates the necessity for specially preparing the light source in the camera.

Additionally, according to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the photo detecting element for detecting the operating state of the shutter with the object light serving as a light source and the shutter detecting element for detecting the operating state of the shutter element with a variable detected photographic speed. It is therefore possible to set the detected photographic speed under the optimum condition according to the necessity.

Further, according to the present invention, the shutter measuring apparatus has the aperture portion which admits the transmission of the photographing light to the recording medium loaded in the camera. The shutter measuring apparatus comprises the shutter element capable of operating the light intercepting state of intercepting the transmission of the photographing light through the aperture portion and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the shutter detecting element for detecting the operating state of the shutter element and outputting the operating state in the form of the pulse signal and the storage element for storing the pulse signal as an analog-converted signal. The determination thereof can be done by the AD converting function.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
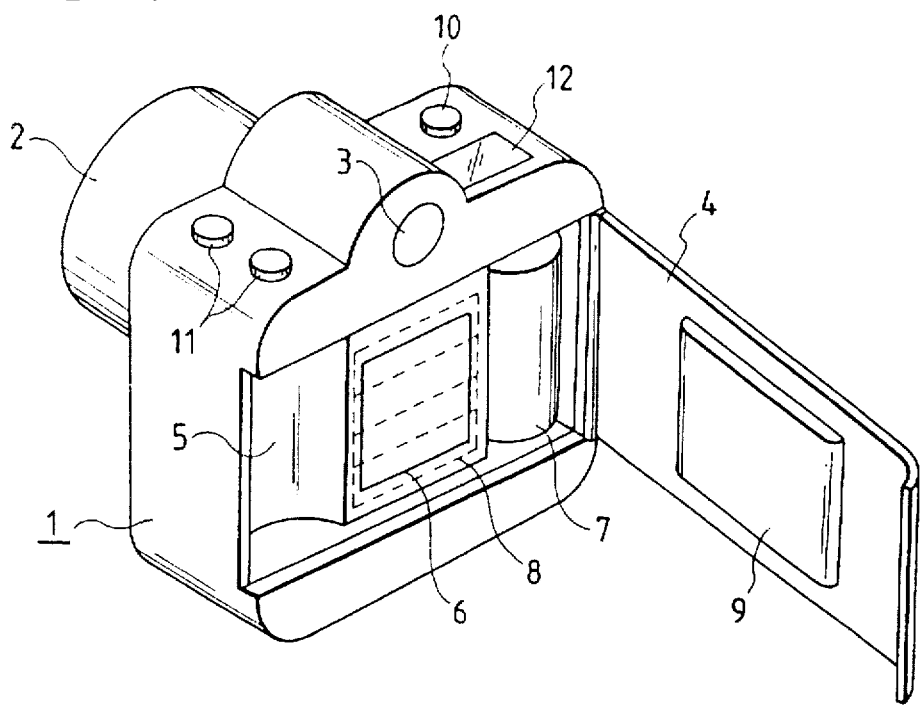
FIG. 1 is a view illustrating an external appearance of a camera having a shutter measuring apparatus according to this invention.

FIG. 1 is an explanatory view illustrating a configuration of a camera 1 according to the present invention.

FIG. 1 shows a state where a rear cover is opened. An unillustrated film Patrone is loaded in a Patrone chamber 5. The film drawn out of the Patrone passes through a front surface of an aperture 6 and is wound on a spool 7. A presser plate 9 provided inwardly of the rear cover 4 acts to keep a planeness by pressing the (film unillustrated) toward the aperture 6. A shutter 8 provided inwardly of the aperture 6 covers an area shown by a broken line in the FIGURE. A beam of light from an object via a lens 2 is projected on a film picture for a predetermined time.

As previously known, a photographer visually recognizes a situation of the object via the lens 2 through a finder 3. The photographer gives a command to start an exposure by pushing a release button 10.

Exposure conditions can be confirmed by a display unit 12 (hereinafter abbreviated to LCD) constructed of a liquid crystal or the like. A plurality of setting buttons 11 which are operation buttons for setting operation modes, photographing conditions, etc. of the camera 1, are disposed on the top surface of camera 1. The setting buttons 11 are manipulated while confirming letters are displayed on the LCD 12.

Figure 2:
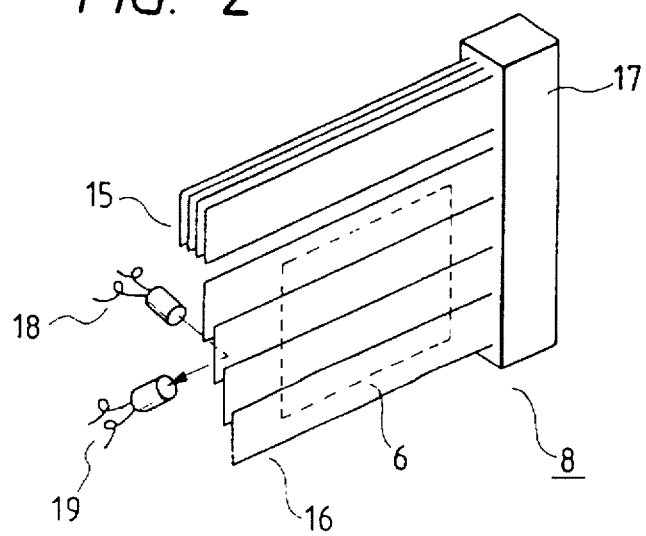
FIG. 2 is a view illustrating a first embodiment of the shutter measuring apparatus of this invention.

FIG. 2 illustrates a first embodiment of the shutter 8 according to the present invention.

An extractive explanation will be given to show only a positional relationship between the shutter 8 and the aperture 6 in the camera 1 of FIG. 1.

FIG. 2 is a representation as viewed from a rear cover side as in FIG. 1. FIG. 2 shows a state before pushing the release button 10, i.e., a state before starting the exposure. The aperture 6 shown by the broken line is covered with a leading curtain 16.

Generally in the camera, the leading curtain is comprised of a plurality of blades. The leading curtain is, as illustrated in FIG. 2, constructed of four blades in this embodiment. The blades are arranged to have portions slightly overlapped with each other in a state where the aperture is covered. Similarly, a tailingcurtain 15 is also constructed of four blades. In the state of FIG. 2, the trailing curtain 15 is on standby while being nested upwardly of the aperture 6.

A block 17 is a member for housing electromagnets and tripping springs. Basically, the block 17 includes two pieces of electromagnets for separately securing the respective curtains constructed of the plurality of blades, two-system springs and, though not illustrated, a known mechanism such as a link mechanism for moving the respective blades up and down in parallel.

The exposing operation from the state described above is performed in the manner which follows.

To start with, the electromagnet for the leading curtain (hereinafter called a leading curtain electromagnet) releases securing of the leading curtain 16. With this action, the leading curtain 16 retreats so as to be nested downwardly of the aperture 6. At this time, the trailing curtain 15 is still on standby while being nested upwardly of the aperture 6. It follows that the aperture 6 has nothing to intercept the light from the object, thus starting the exposure on the film. Further, after a predetermined time has elapsed, the electromagnet for the trailing curtain (hereinafter referred to as a trailing curtain electromagnet) releases securing of the trailing curtain 15. The trailing curtain 15 moves downward to extend over the aperture 6 from an illustrated position. With this action, the aperture 6 is covered with the trailing curtain 15 at this time. The exposure for the predetermined time is thus completed.

After being exposed in the manner described above, an take-up mechanism (unillustrated) feeds one frame of the film, with the result that an unexposed area of the film comes into a face-to-face relationship with the aperture 6. The respective curtains 15, 16 revert to a before-the-exposure state by raising the curtains.

The shutter 8 incorporates, as illustrated in the FIGURE, a shutter curtain trip detecting device constructed of a light emitting diode 18 (hereinafter termed an LED) 18 and a photo transistor (hereinafter termed a PTR) 19.

A beam of light from the LED 18, if the leading curtain 16 or the trailing curtain 15 exists, falls on the PTR 19 after being reflected therefrom. Whereas if both of the curtains 15, 16 do not exist, no light is incident on the PTR 19. From the above distinction, it is possible to detect a static existence of each of the curtains 15, 16 and further a dynamic timing relationship therebetween.

More specifically, as depicted in FIG. 2, the light from the LED 18 falls on the PTR 19 in a state where the aperture 6 before starting the exposure is covered with the leading curtain 16, or in a state where the aperture 6 after finishing the exposure is covered with the trailing curtain 15. Reversely, during the exposure, the leading curtain 16 moves away from the aperture 6, and the trailing curtain 15 is in the standby state. In this case, the light from the LED 18 does not reach the PTR 19.

Note that the film is prevented from being exposed to the light emitted from the LED 18; and the light of the object via the lens 2 is prevented from being intercepted by the LED 18 and the PTR 19. For this purpose, the LED 18 and the PTR 19 are disposed off a photographing light path to an opening area of the aperture 6. A state-detection is done by use of blade tips of the leading and trailing curtains 16, 15 existing outwardly of the aperture 6.

Further, the leading curtain 16 or the trailing curtain 15 is tripped, and the blade tip thereof is on the verge of intercepting the light beams of the LED 18 and the PTR 19. In this state, an output of the PTR 19 is inverted, and, therefore, a dynamic analysis can be done by measuring a timing interval therebetween.

Figure 3:
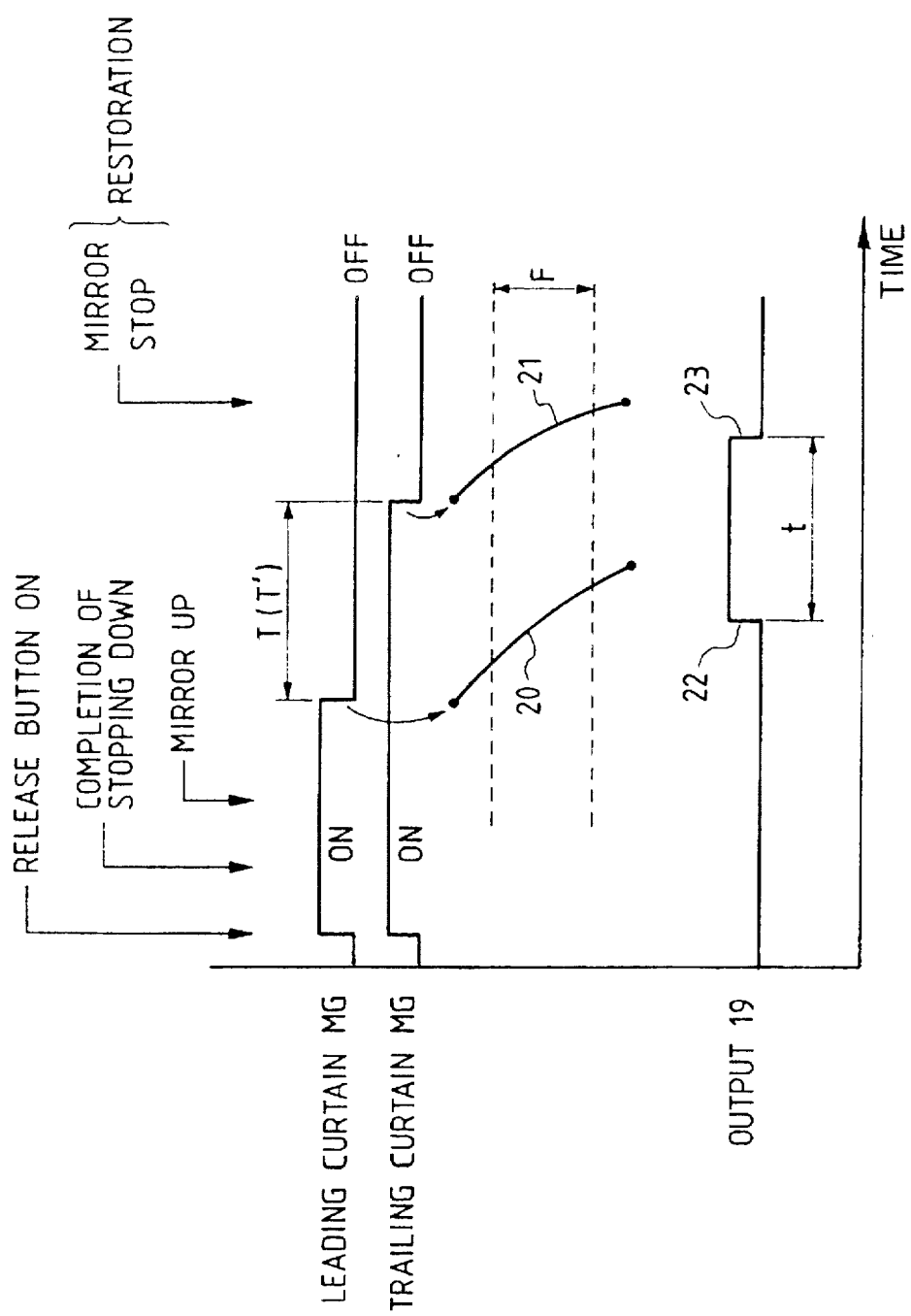
FIG. 3 is a timing chart showing an example of timings in the shutter measuring apparatus.

FIG. 3 is a timing chart showing actions of the shutter 8 described above.

FIG. 3 shows a curtain tripping state variable depending on on/off timings of magnets (MG) for controlling the respective curtains and variation in detection signal of the PTR 19 as well.

When pushing the release button 10, the leading and trailing curtains are energized and turned on, thus starting securing each curtain electrically. As known well, before depressing the release button 10, the curtain is mechanically secured. This mechanical securing is switched over to the electric securing. Thereafter, stop-control of the lens 2 is at first executed by operating an unillustrated mechanism. A flip-up of a reflecting mirror on the photographing light path is executed.

Next, the leading curtain magnet is turned off. The leading curtain 16 is thereby tripped as shown by a tripping curve 20. An area F shown by a broken line herein indicates the opening area of the aperture 6. The curtain is tripped in such a way that the tripping curve 20 depicts a trajectory as seen in the FIG. 3 within the opening area F. On this occasion, the leading curtain 16 passes through the above detecting element midway of tripping. A detection signal of the PRT 19 rises as seen in a timing 22 and is inverted.

Further, thereafter, the trailing curtain magnet is turned off after a passage of a time T (or T' which will be mentioned later) defined as a preset exposure time. Thus, the trailing curtain 15 moves across the opening area F as depicted by the tripping curve 21. At this time also, the trailing curtain 15 passes through the detecting element, and the output of the PTR 19 is fallen as seen in a timing 23 and inverted. This output thus reverts to the previous output state.

A time between the thus obtained inverted timings 22, 23 of the PTR 19 is measured. It is thereby possible to detect a time till the trailing curtain 15 is closed after the leading curtain 16 has been opened within the opening area of the aperture 6, i.e., a real exposure time t.

With this operation, for instance, an exposure control circuit correctly measures the predetermined time T (or T'), and the magnet is driven at a correct timing. Even in such a case, if the control time t obtained from the PTR 19 is different from the predetermined time T (or T'), it can be determined that a malfunction is induced in the mechanical system.

Figure 4:
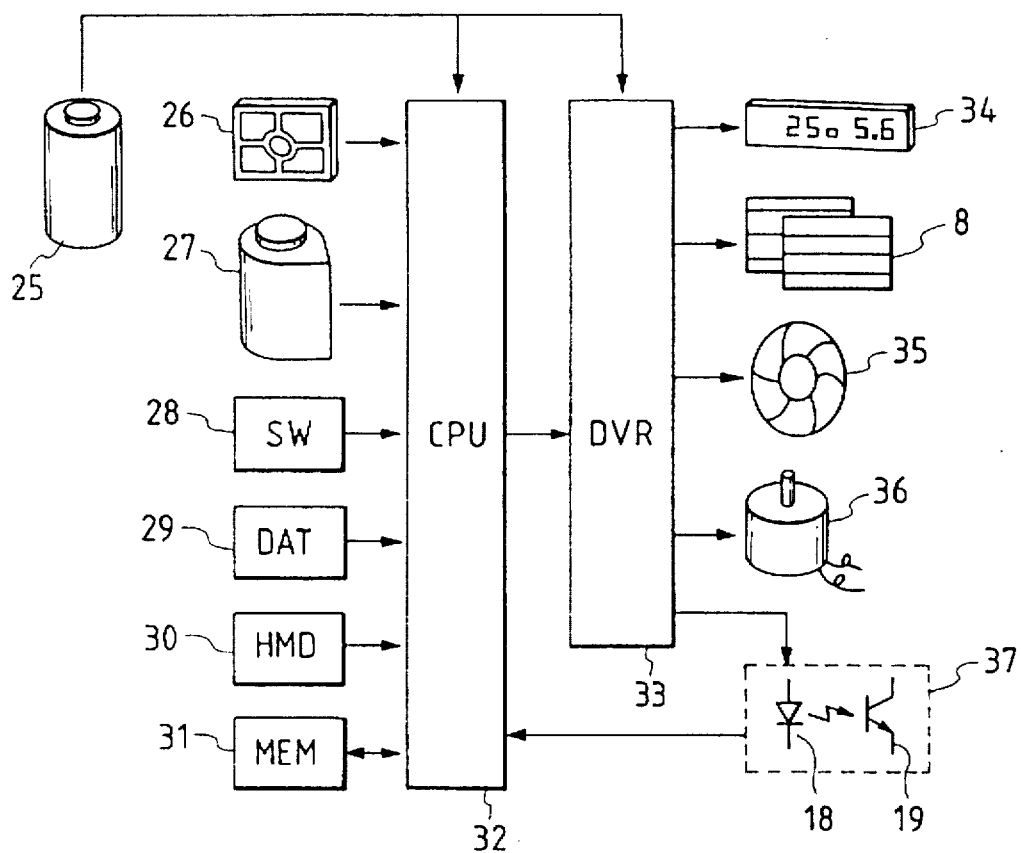
FIG. 4 is a block diagram showing an example of an electric circuit of the camera.

FIG. 4 illustrates an embodiment of an electric circuit block of the camera 1 according to this invention.

A battery 25 is a power supply in this circuit. Central control is executed by a CPU 32. Signals are inputted to the CPU 32 in the following manner.

To begin with, a photometric device 26 measures a brightness in each of partitioned areas of the object. A plurality of photometric values are inputted to the CPU 32. A film speed detector 27 reads code signals given to a side surface of the loaded film Patrone. Film speed information is inputted to the CPU 32. A switch detector 28 is constructed of operation switches including switches interlocking with the setting buttons 11 and a timing switch for detecting a sequence state of the camera. State information of the camera is inputted to the CPU 32. A date detector 29 performs a timer action at all times. Inputted to the CPU 32 are bits of time information such as years, months, dates, hours, minutes and seconds. A humidity detector 30 detects an ambient environment in which the camera exists or an in-camera humidity. A humidity signal is inputted to the CPU 32. A memory 31 is a device capable of inputting and outputting the signals and storing the input signals. The memory 31 incorporates a function to store, e.g., information on the number of operations of the camera 1 and to input a variety of signals stored therein to the CPU 32 according to the necessity.

An output from the CPU 32 is transferred via a driver 33 and serves to execute the following drive. An LCD 34 is driven to display alarm information and pieces of information on the exposure and setting of operation modes. The shutter 8, particularly, the leading curtain magnet 16 and the trailing curtain magnet 15, is driven to control the exposure time as explained before. A stop 35 within the lens 2 is driven to regulate a quantity of transmitted light. A motor 36 is driven to control the winding/rewinding feed of the film and a biasing action of the above shutter driving spring. A shutter curtain detector 37 is controlled. More specifically, as stated earlier, the LED 18 is flashed, and the CPU 32 receives the signal generated from the PTR 19.

Figure 5:
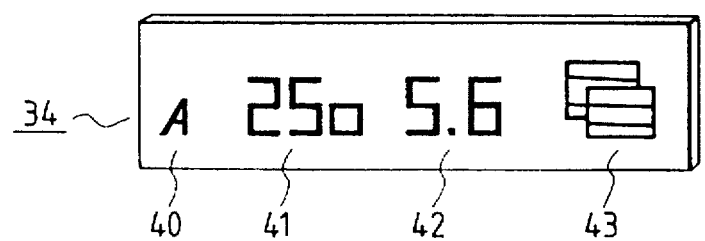
FIG. 5 is a view showing a display example on a display element used in the camera.

FIG. 5 shows one example of flash-display by way of a detailed example of the LCD 34 shown in FIG. 4.

Segments 40, 41, 42 numerically indicate the operation modes of the camera, a set shutter time and a set stop value. A segment 43 is a symbolic mark displayed when determining that an action of the shutter 8 is abnormal and gives an alarm indicating this state to the photographer. The segment 43 remains non-flashed in a normal state with no abnormality. A lighting state of the segment 43 includes continuous lighting, slow flashing and fast flashing. These flashing states are switched over depending on importance of contents of which the photographer is to be informed.

Figure 6:
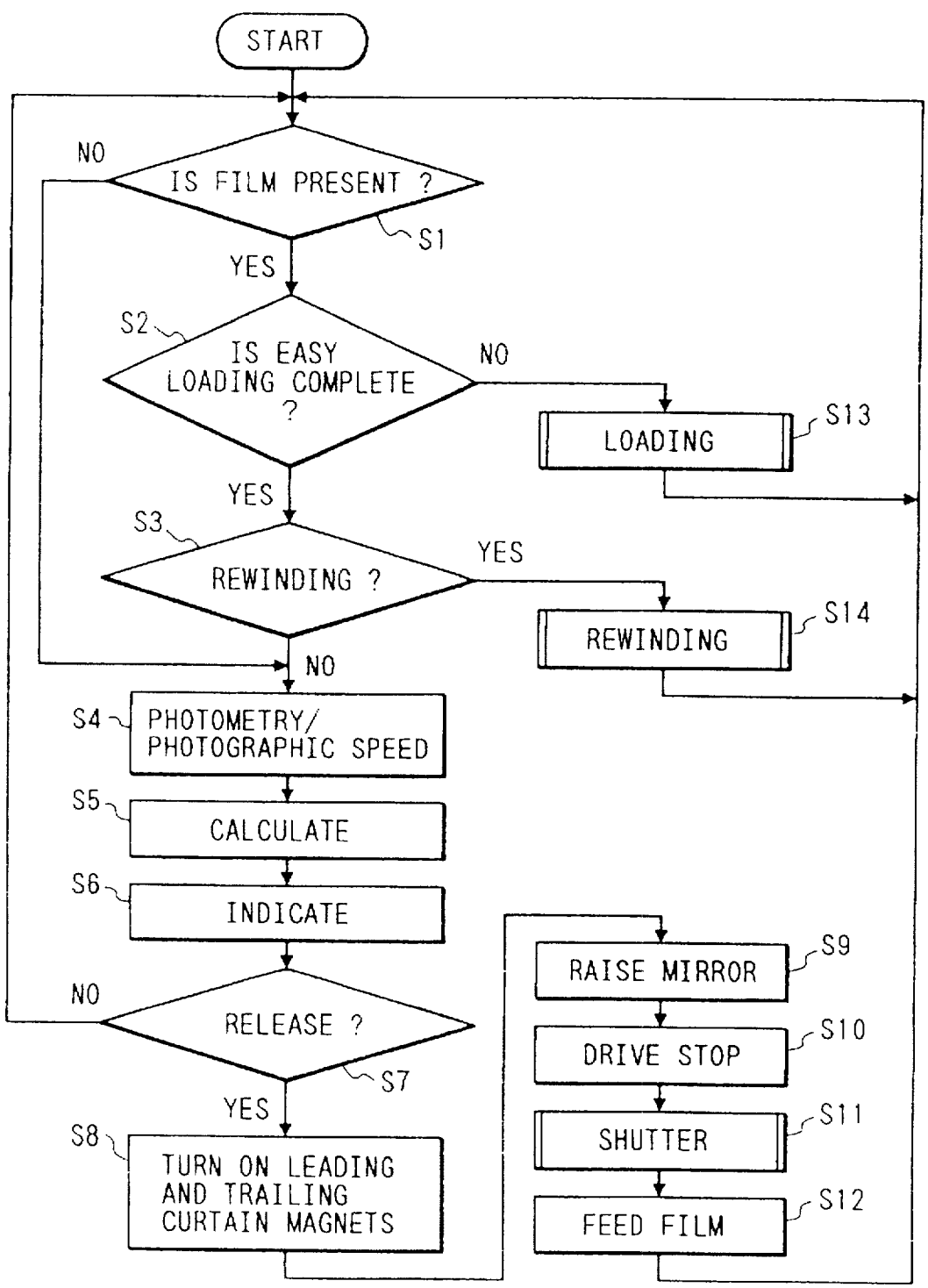
FIG. 6 is a flowchart showing a processing example of general actions in the camera.

FIG. 6 shows an example of a processing routine of the CPU 32 which includes a general state of use of the camera 1.

A main routine is started with power-on of the CPU 32.

S1: Determined is whether or not the film is loaded. If loaded, the action proceeds to S2. Whereas if not loaded, the action jumps S2, and S3 of loading and rewinding routines over to S4.

S2: Determined is whether or not there has already been finished letting out a head of unexposed frames, which processing is needed immediately after loading. Whether the loading is finished or not is determined with reference to loading information stored in the above memory 31. If the loading process is finished, the action proceeds to S3. Whereas if not finished, the action shifts to a loading routine of S13. The loading routine will be described in detail later.

S3: Whether or not the film rewinding process is commanded is determined through the switch detector 28. If not commanded, the action proceeds to S4. Whereas if commanded, the action shifts to a rewinding routine of S14. The details thereof will be described later.

S4: A photometric signal and a photographic speed signal are taken out of the photometric device 26 and the film speed detector 27.

S5: A calculation is effected based on the two signals taken in. A shutter speed and an f-number that are defined as proper exposure conditions are calculated.

S6: The thus obtained exposure conditions are displayed on the LCD 34.

S7: Whether or not the release button 10 is pushed is determined through the switch detector 28. If pushed, the action proceeds to S8. Whereas if not, the action returns to S1, and the above processes are repeated.

S8: The release button 10 has been pushed, and, therefore, as explained with respect to FIG. 3, the leading and trailing curtain magnets are at first turned on.

S9: The unillustrated reflecting mirror flips up to move away from the photographing light path.

S10: The stop 35 is driven to obtain a predetermined aperture of stop.

S11: A shutter routine for controlling the exposure on the film is executed by opening and closing the shutter 8. The control of the shutter routine will be explained in detail later with reference to FIG. 9.

S12: A motor 36 is rotated forward with a completion of the exposing process, thereby feeding the film and performing a biasing action of the mechanism.

The exposing process is thus cycled once, and hence the action goes back to S1 wherein the above processes are repeated.

Figure 7:
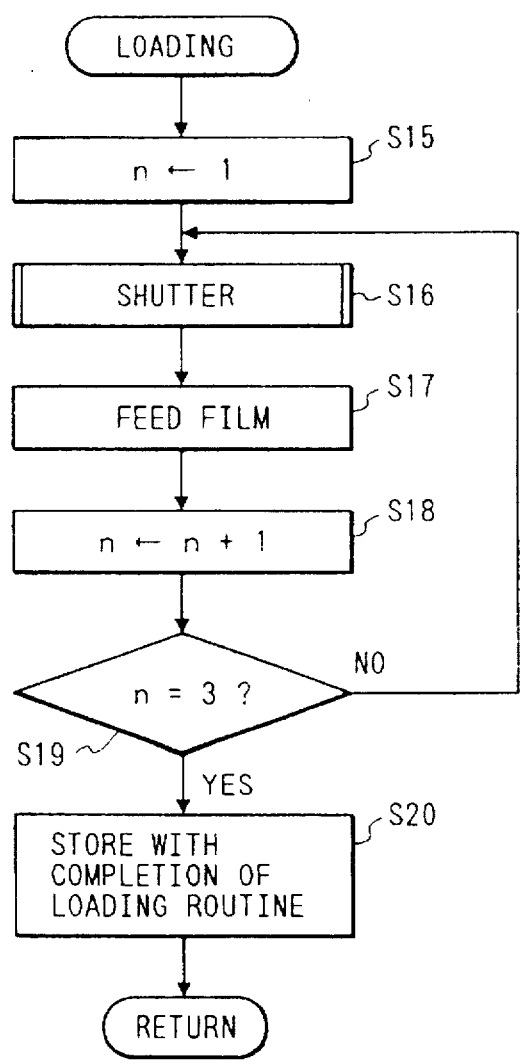
FIG. 7 is a flowchart showing a processing example of the general actions in the camera.

FIG. 7 shows details of the loading routine shown in S13 of FIG. 6. A newly loaded film is wound up by three frames, thus letting out the first unexposed frame.

S15: At the first onset, 1 is set to a constant n.

S16: The shutter routine for controlling the exposure on the film is executed by opening and closing the shutter 8. The details of control will be described later with reference to FIG. 9.

S17: The motor 36 is rotated forward, thereby executing a one-frame feed of the film and a one-frame biasing process of the mechanism as well.

S18: The film is fed by one frame. Accordingly, 1 is added to the constant n to obtain a new constant n.

S19: Whether or not the constant n reaches 3 is determined. If equal to or less than 3, the processes from S16 are repeated once again.

S20: The memory 31 memorizes that the loading routine has been completed. Note that this recording state is reset with an action of replacing the film.

After finishing the above processes, as illustrated in FIG. 6, the action returns to S1 to repeat the above processes.

Figure 8:
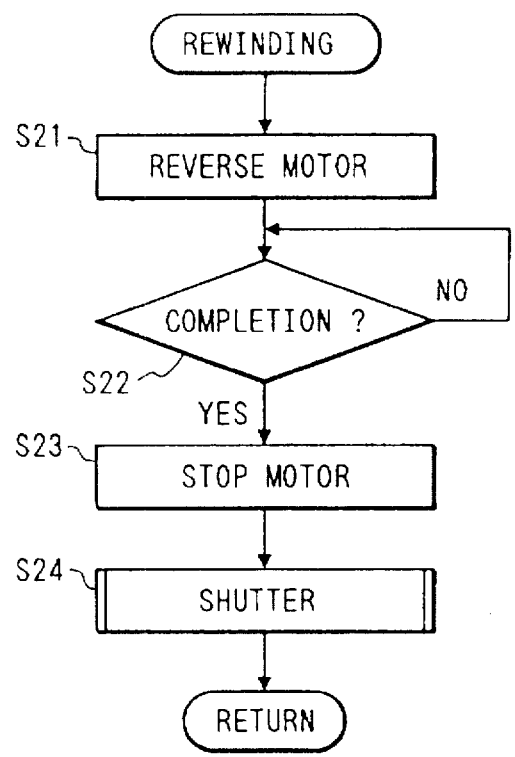
FIG. 8 is a flowchart showing a processing example of the general actions in the camera.

FIG. 8 shows details of a rewinding routine of S14.

S21: Film rewinding is started by reversely rotating the motor 36.

S22: Whether or not the rewinding process is completed is determined, and there is a wait for the completion thereof.

S23: Since the rewinding process has been completed, the motor 36 stops.

S24: The shutter routine for controlling the exposure on the film is executed by opening and closing the shutter 8. The control will be stated in detail later referring to FIG. 9.

After an end of this process, the action returns to S1 wherein the above processes are repeated.

Figure 9:
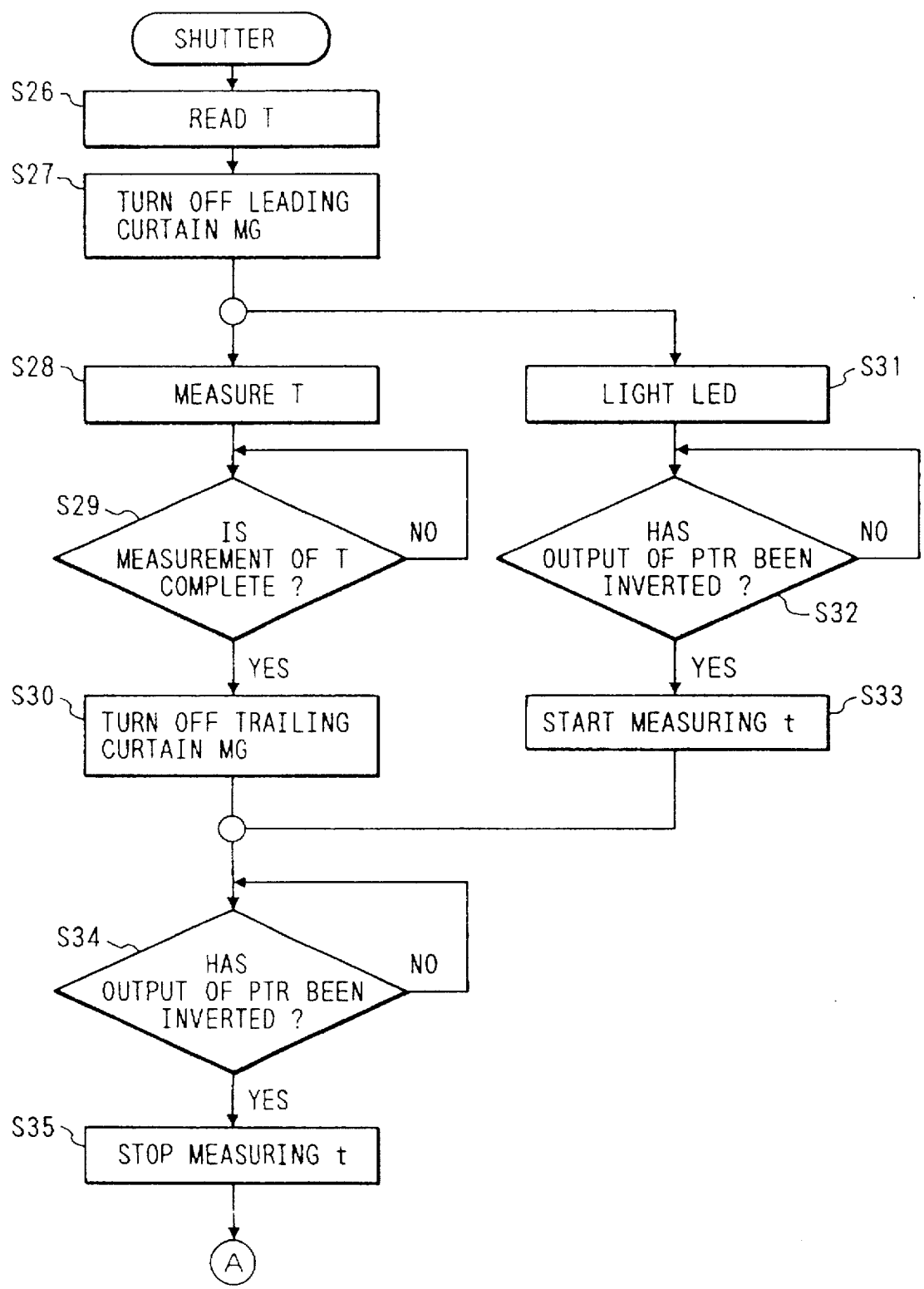
FIG. 9 is a flowchart showing an example of measurement processing of the shutter.
Figure 10:
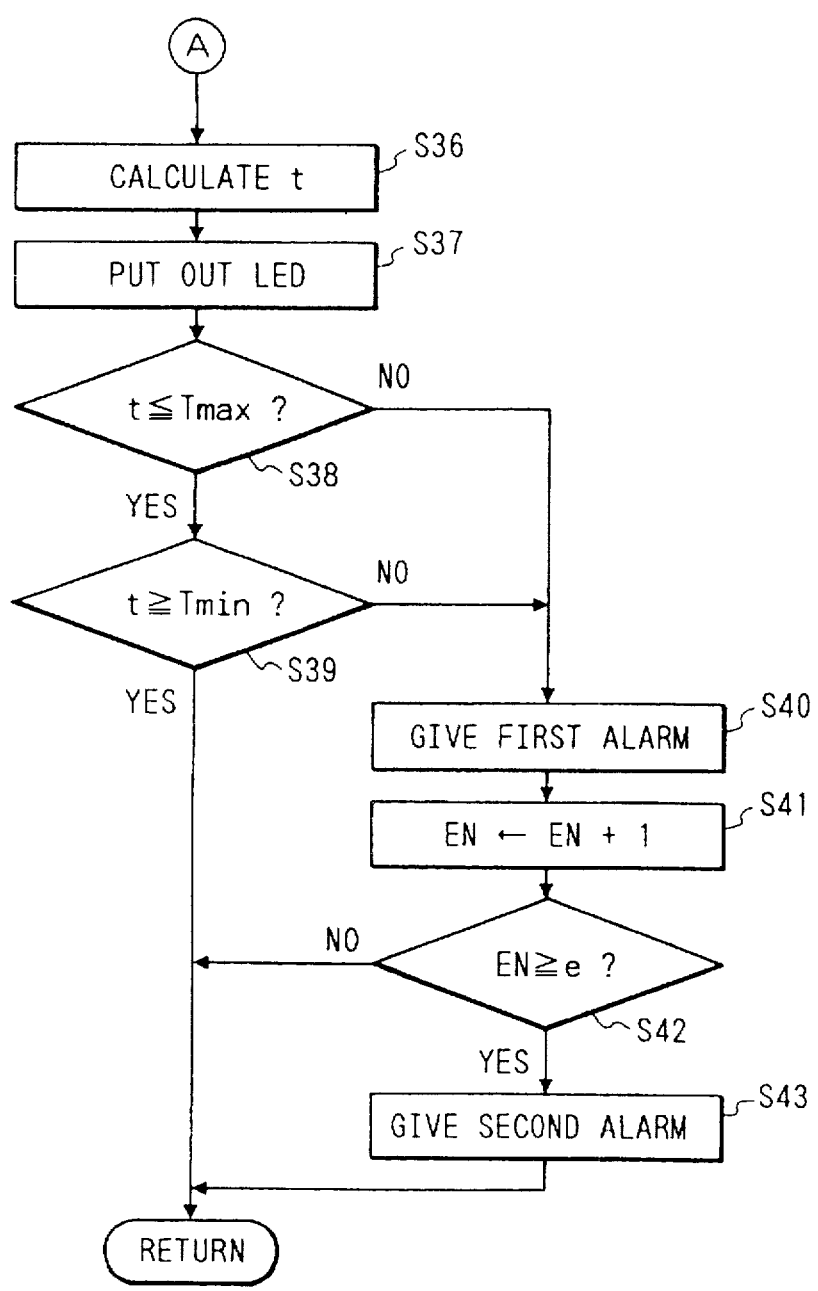
FIG. 10 is a flowchart showing an example of measurement processing of the shutter.

FIGS. 9 and 10 show detailed examples of the shutter control routine shown in S11, S16, S24 of FIGS. 6, 7 and 8.

S26: To start with, a shutter speed T to be regulated is read. This value T is defined as an in-terms-of-calculation shutter speed value obtained arithmetically in S5 of FIG. 6. The shutter speed value is to be displayed in the segment 41 on the LCD 34.

S27: The leading curtain magnet is turned off. Then, exposure is started.

Thereafter, subsequent actions separated into S28 and S31 are processed in parallel.

S28: An unillustrated counter within the CPU 32 starts counting the control time T.

S29: A completion of time-counting is awaited.

S30: Counting the control time T is completed, and consequently the trailing curtain magnet is turned off. The exposure is now completed.

S31: The LED 18 is lit up.

S32: There is a wait for an inversion of the output of the PTR 19. Tripping the leading curtain 16 is detected as seen in a timing 22 of FIG. 3.

S33: The trip of the leading curtain 16 is detected. Therefore, a counter different from the counter which is counting the control time T within the CPU 32 starts counting an exposure time t.

For simplifying the explanation in this embodiment, the explanation is given by exemplifying a comparatively large shutter speed value. Hence, the process subsequent to S30 is executed in waiting for S33. That is, the example is that the trailing curtain MG is turned off invariably after the timing 22 as illustrated in FIG. 3.

Omitted is an explanation of processing in a case where the shutter speed is high, and turning off the trailing curtain MG is executed before the timing 22. This is, however, readily embodied by use of a known parallel processing technology.

S34: The inversion of the output of the PTR 19 is waited. As seen in a timing 23 of FIG. 3, the trip of the trailing curtain 15 is detected.

S35: The trip of the trailing curtain 15 is detected, and accordingly the counting of the exposure time t is ended.

S36: The exposure time t read by the counter is read out. As stated before, the time t is a true exposure time.

S37: The LED 18 is extinguished to save electricity.

S38: The actually measured exposure time t is compared with an allowable maximum value Tmax of the control time T. If over the maximum value, the action shifts to S40.

S39: The actually measured exposure time t is compared with an allowable minimum value Tmin of the control time T. If under the minimum value, the action shifts to S40.

S40: The exposure time t deviates from the allocable values of the control time T. Consequently, the segment 43 of the LED 34 explained in FIG. 5 is lit up or flashed at long intervals. There is thus given a first mode alarm to inform the photographer of the fact that the exposure time exceeds the allowable limits.

S41: 1 is added to an error number EN. The error number EN is an integrated value of the number of times with which the exposure time t exceeds the allowable values.

S42: Determined is whether or not the theretofore-integrated error number EN exceeds a predetermined value e.

S43: Since the error number EN becomes the predetermined value or larger, a second mode alarm stronger than the first mode alarm is given. According to the second mode alarm, for instance, a strong notification is given by quickly flashing the segment 43 of the LED 34. Further, the alarm is given in combination with a release lock. This is the second mode alarm for avoiding a futile consumption of the film because of an impossibility of further photography. This mode alarm is a transient alarm indicating that the exposure time is out of order due to a disorder of the mechanical system which has been caused by chance. The alarm may be displayed in a non-strong manner as extinguished after the predetermined time has elapsed. However, the second mode alarm has a high possibility in which the mechanical system may undergo a continuous disorder and therefore has to incorporate a function to prompt a quick repair.

By the way, the error number EN may, as a matter of course, be reset to an initial value just when detecting that the error happens by chance. Specifically, the error number is reset by use of the above date detector 29, if a next error does not happen for a predetermined or longer time even after the error has been induced.

Figure 11:
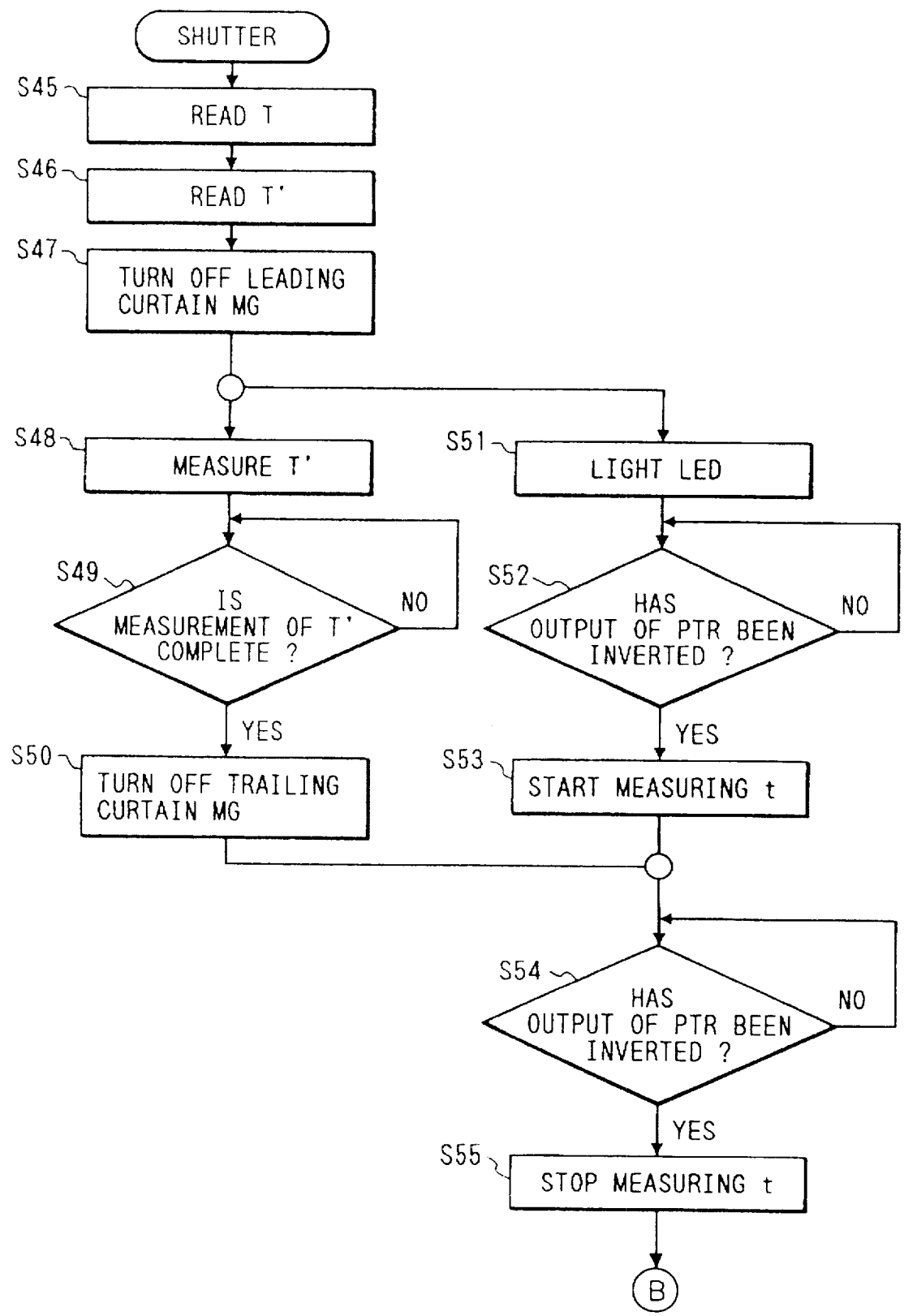
FIG. 11 is a flowchart showing an example of measurement processing of the shutter.
Figure 12:
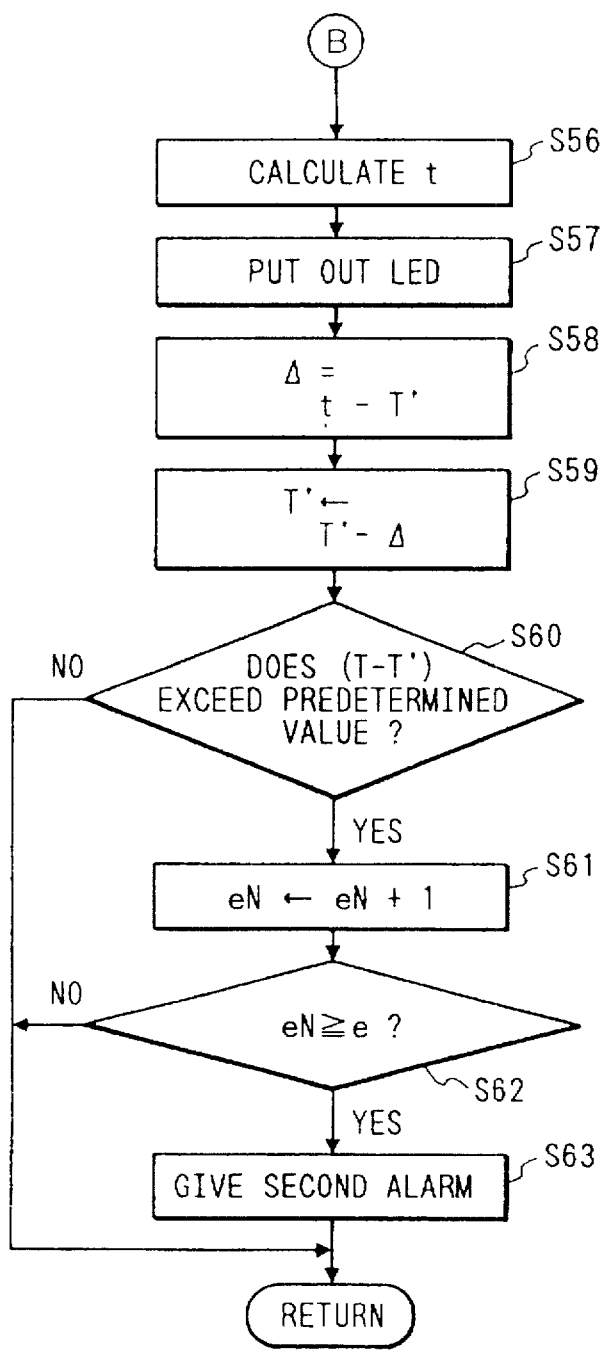
FIG. 12 is a flowchart showing an example of measurement processing of the shutter.

FIGS. 11 and 12 show other detailed examples of the shutter control routine shown in S11, S16, S24 of FIGS. 6, 7 and 8.

S45: To begin with, the control time T is read. This value T is defined as an in-terms-of-calculation shutter speed value obtained arithmetically in S4 of FIG. 6. This value is to be displayed in the segment 41 on the LCD 34.

S46: A new control time T' corresponding to the control time T is obtained. The new control time T' is, as will be stated below, such a shutter speed that a correction is applied to the in-terms-of-calculation control time T to obtain a proper exposure time. For example, this is the control time corrected for absorbing a mechanical tripping time error inclusive of a variation due to a change in terms of time-measurement and a subtle difference in trip timing between the leading and trailing curtains.

S47: The leading curtain magnet is turned off. The leading curtain 16 is thereby released from being secured, with the result that the curtain is tripped. The exposure on the film is thus started. Thereafter, actions subsequent to S48 and S51 are processed in parallel.

S48: The unillustrated counter within the CPU 32 starts counting the control time T'.

S49: A completion of counting of the control time T' is awaited.

S50: The counting of the control time T is completed, and hence the trailing curtain magnet is turned off. Tripping of the trailing curtain 15 is thereby started. Thereafter, the aperture 6 is covered therewith, thus completing the exposure process.

S51: The LED 18 is lit up.

S52: There is a wait for the inversion of the output of the PTR 19. The tip of the leading curtain 16 is detected as seen in the timing 22 shown in FIG. 3.

S53: The leading curtain 16 is tripped, and consequently a different counter within the CPU 32 starts counting the exposure time t.

S54: The inversion of the output of the PTR 19 is awaited. The trip of the trailing curtain 15 is detected as shown in a timing 23 illustrated in FIG. 3.

S55: The trip of the trailing curtain 15 is detected, and, therefore, counting the exposure time t is completed.

S56: The counted time t read by the different counter is obtained. As stated earlier, the time t is a true exposure time.

S57: The time-measurement comes to an end, and hence the LED 18 is extinguished.

S58: Obtained is a time difference Δ between the true exposure time t and the electrically regulated control time T'.

S59: The difference Δ detected this time is subtracted from the exposure time T' regulated last time, thus obtaining an updated control time T'. This control exposure time T' is employed when operating the shutter next time.

S60: Obtained is a difference between the in-terms-of calculation control time T and the control time T' obtained by the above processing, i.e., a correction time. Whether or not this difference exceeds a fixed value is determined. Excessiveness of the correction time implies a perpetual disorder of the mechanical system. If the correction time is not excessive, the action is returned. Whereas if excessive, the action proceeds to S61.

S61: Since the correction time is excessive, 1 is added to an error number eN. The error number eN in the case of this FIGURE is an integrated value of the number of times of detecting that the correction time is excessive.

S62: Whether or not the theretofore-integrated error number eN exceeds a predetermined value e is determined. If over the predetermined value e, the action proceeds to S63. Whereas if not, the action is returned.

S63: The error number eN becomes equal to or larger than the predetermined value e, and, hence, a strong notification is given by quickly flashing the segment 43 of the LCD 34. Further, the alarm is given in combination with the release lock. From the same gist as that in S43 of FIG. 10, further photography is impossible. Accordingly, the second mode alarm is given to avoid the futile consumption of the film. The second mode alarm shows the continuous disorder of the mechanical system and has to incorporate the function to prompt the quick repair.

In this routine also, in the same way with the routine shown in FIG. 10, after repairing the disordered mechanism, the error number eN may, as a matter of course, be reset to the initial value by utilizing the information of the date detector 29, saying that the error happens by chance.

Figure 13:
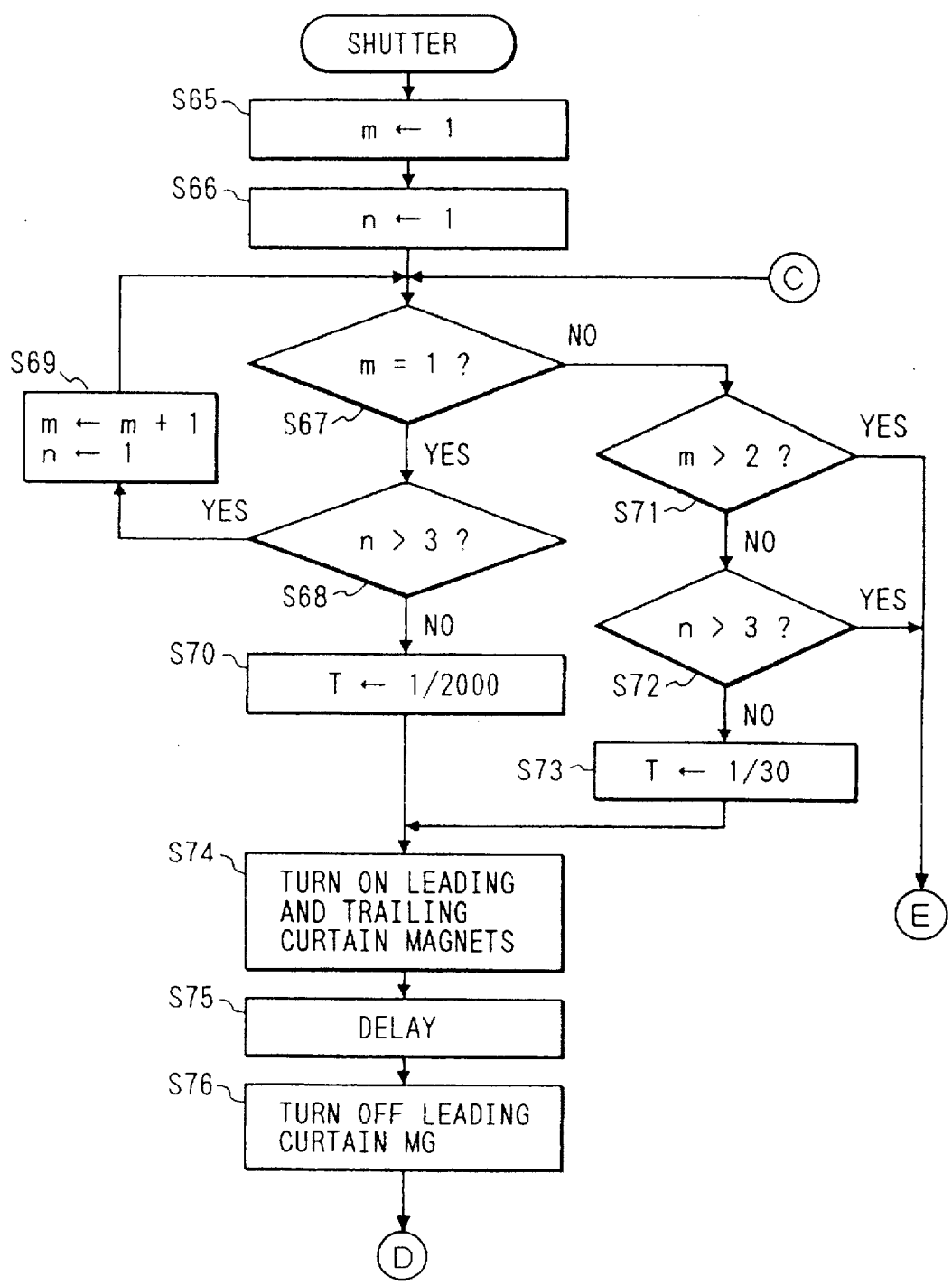
FIG. 13 is a flowchart showing an example of measurement processing of the shutter.
Figure 14:
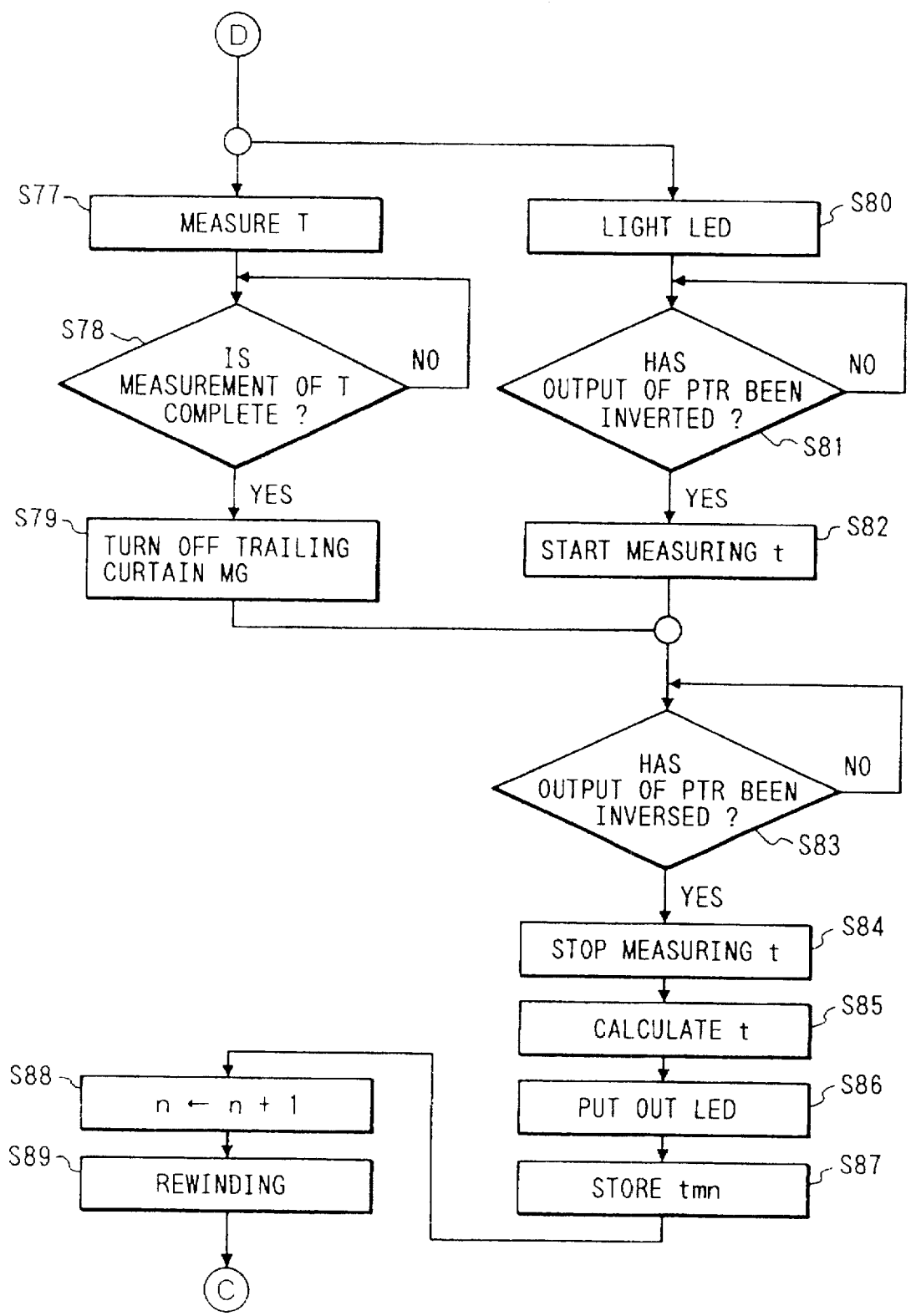
FIG. 14 is a flowchart showing an example of measurement processing of the shutter.
Figure 15:
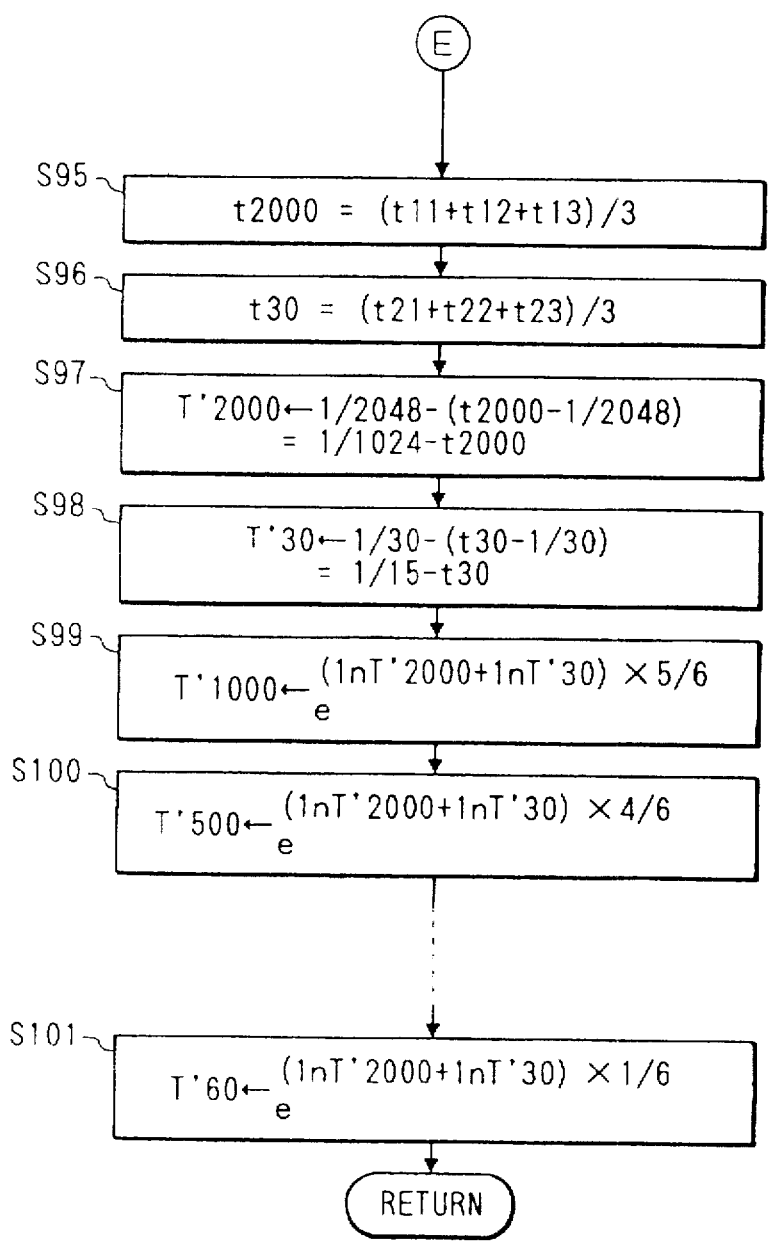
FIG. 15 is a flowchart showing an example of measurement processing of the shutter.

The thus explained routines of FIGS. 9, 10, 11 and 12 are usable for each processing in S11, S16, S24. Every routine is such that the alarm is given with the determination by counting the exposure time when operating the shutter 8 once. An embodiment which will be next explained and shown in FIGS. 13, 14 and 15 is another version in which the routine is usable for processing in S16, S24.

This embodiment is not that, when performing the normal film exposure process, only the shutter speed used is measured during the actual exposure process but that the measurement is executed under conditions where absolutely no influence is exerted on the loaded film.

In accordance with this embodiment, the measurement is executed during the loading routine in S16 of FIG. 7 or after finishing the rewinding routine in S24 of FIG. 8.

Under such conditions, the measurements of a plurality of shutter speeds are executed a plurality of times. It is possible to effect such an operation that measured results thereof are averaged to make a correction. Further, the actual shooting is not conducted. Hence, the control over the above mirror-up-and-down and the stop is not carried out. Essentially, the control thereof is not associated with measuring the shutter speed. Detecting the shutter speed is executable at a high speed by this method.

Herein, two shutter speeds of 1/2000 sec and 1/30 sec are given as a plurality of shutter speeds for measurement. A determination is made based on a result obtained by repeating each measurement three times. The measurement is effected three times at 1/2000 sec and conducted next three times at 1/30 sec.

S65: A constant m is initialized to 1 for indicating that the measurement is to be carried out at 1/2000 sec.

S66: A constant n is initialized to 1 for counting the number of measurements at 1/2000 sec.

S67: Whether or not the constant m is 1 is determined. If not identical with 1, the action proceeds to S74. Whereas if identical with 1, the action proceeds to S68.

S68: Determined is whether or not the constant n exceeds 3. If over 3, the action proceeds to S69. Whereas if not over 3, the action proceeds to S70.

S69: The constant m is 1, and n is 3 or above, and hence 1 is added to the constant m. The constant n is reset to 1. This implies that the measurement at 1/30 sec is executed because of a completion of effecting the measurement three times at 1/2000 sec.

S70: The constant m is 1. Accordingly, the control shutter speed T is set to 1/2000 sec, and the action proceeds to S74.

S71: The action proceeds after determining that the constant m is not 1. Therefore, whether or not the constant m is 2 or larger is determined. If equal to or larger than 2, the action shifts to S95.

S72: Whether or not the constant n is 3 or greater is determined. If equal to 3 or greater, the action shifts to S95.

S73: The constant m is not 1 but does not exceed 2. Namely, the constant m is 2. Further, the shutter speed T is set to 1/30 sec because the measurement is not effected three times completely. Thereafter, the action proceeds to S74.

S74: The leading and trailing curtain magnets are turned on, and electric securing is started.

S75: A fixed delay time is provided. This is required for waiting a response from the mechanism. If measured during the normal photographing routine, a time lag is produced due to the mirror-up and the stop-control time. In this routine, however, the mirror-up and the stop-control are not performed. Accordingly, a delay time corresponding thereto is required.

S76: The leading curtain magnet is turned off. With this process, the leading curtain 16 of the shutter 8 starts tripping. Thereafter, actions subsequent to S77 and S80 are processed in parallel.

S77: The unillustrated counter within the CPU 32 starts counting the control time T.

S78: A completion of counting the control time T is awaited.

S79: Counting the control time T is completed, and, therefore, the trailing curtain magnet is turned off. With this process, the trailing curtain 15 of the shutter 8 starts tripping.

S80: The LED 18 is lit up.

S81: The inversion of the output of the PTR 19 is awaited. There is a wait for detecting the trip of the leading curtain 16 as seen in the timing 22 of FIG. 3.

S82: The trip of the leading curtain 16 is detected. Accordingly, another counter within the CPU 32 starts counting the exposure time t.

S83: The inversion of the output of the PTR 19 is awaited. There is a wait for detecting the tip of the trailing curtain 15 as seen in the timing 23 of FIG. 3.

S84: Counting the exposure time t is ended because of detecting the trip of the trailing curtain 15.

S85: The counted time t is obtained from another counter. As discussed above, the time t is a true exposure time. Note that this counted time t is set such as tmn on the basis of values of the constants m, n to indicate which shutter speed and which number of times to count the time t.

S86: The LED 18 is extinguished.

S87: The counted time tmn is stored in the memory 31.

S88: 1 is added to the constant n.

S89: The film is wound up by rotating the motor 36. Simultaneously, the biasing process of the mechanism is carried out. Thereafter, the action returns again to S67 wherein the above processes are repeated. The time is measured three times at each of two kinds of shutter speeds, i.e., 1/2000 sec and 1/30 sec.

Then, the measurement performed three times at each of two kinds of shutter speeds, is completed for a total of six times for measurement. That is, if six kinds of measured results are stored, the action proceeds via S67, S71, S72 to S95 subsequent thereto.

S95: Times (t11, t12, t13) measured three times under such control that T is 1/2000 sec are averaged, and the result thereof is t2000.

S96: Times (t21, t22, t23) measured three times under such control that T is 1/30 sec are averaged, and the result thereof is t30.

S97: A correction quantity (t2000–1/2048) is obtained from a difference between the above average actual measuring result t2000 and a known ideal value 1/2048 sec. This correction quantity is further subtracted from the ideal value 1/2048, thereby obtaining a new control value T'2000.

Herein, the correction quantity is added to T'2000. Hence, if driven at this time, the shutter speed is equalized to the ideal value.

S98: A correction quantity (t30–1/30) is obtained from a difference between the above average actual measuring result t30 and an ideal value 1/30 sec. This correction quantity is further subtracted from the ideal value 1/30, thereby obtaining a control value T'30.

Herein, the correction quantity is added to T'30. Hence, if driven at this time, the shutter speed is equalized to the ideal value.

S99: There are six stages of differences between 1/2048 and 1/30. Therefore, an allocating process is performed by equally dividing a value between respective correction control values into each shutter speed. To begin with, a difference 5/6 between the correction control values T'2000 and T'30 is obtained, and a correction control value T'1000 of 1/1000 sec is obtained.

S100: A difference 4/6 between the correction control values T'2000 and T'30 is obtained, and a correction control value T'500 of 1/500 sec is obtained. Hereafter, respective correction control values T'250, T'125 are similarly acquired.

S101: Obtained is a difference 1/6 between the correction control values T'2000 and T'30. A correction control value T'60 of 1/60 sec is acquired.

Hereafter, the respective correction control values are similarly obtained.

Figure 16:
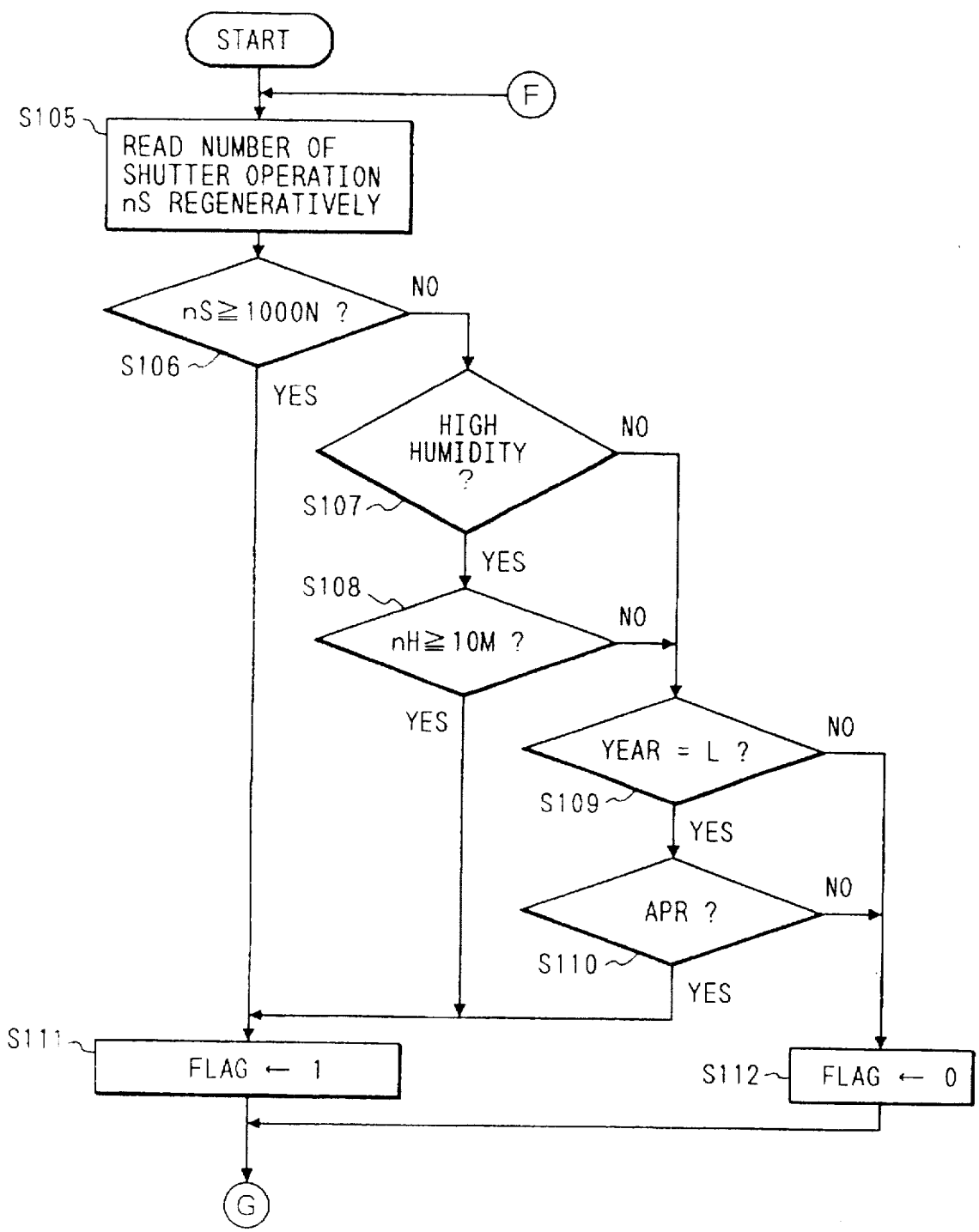
FIG. 16 is a flowchart showing an example of measurement processing of the shutter.
Figure 17:
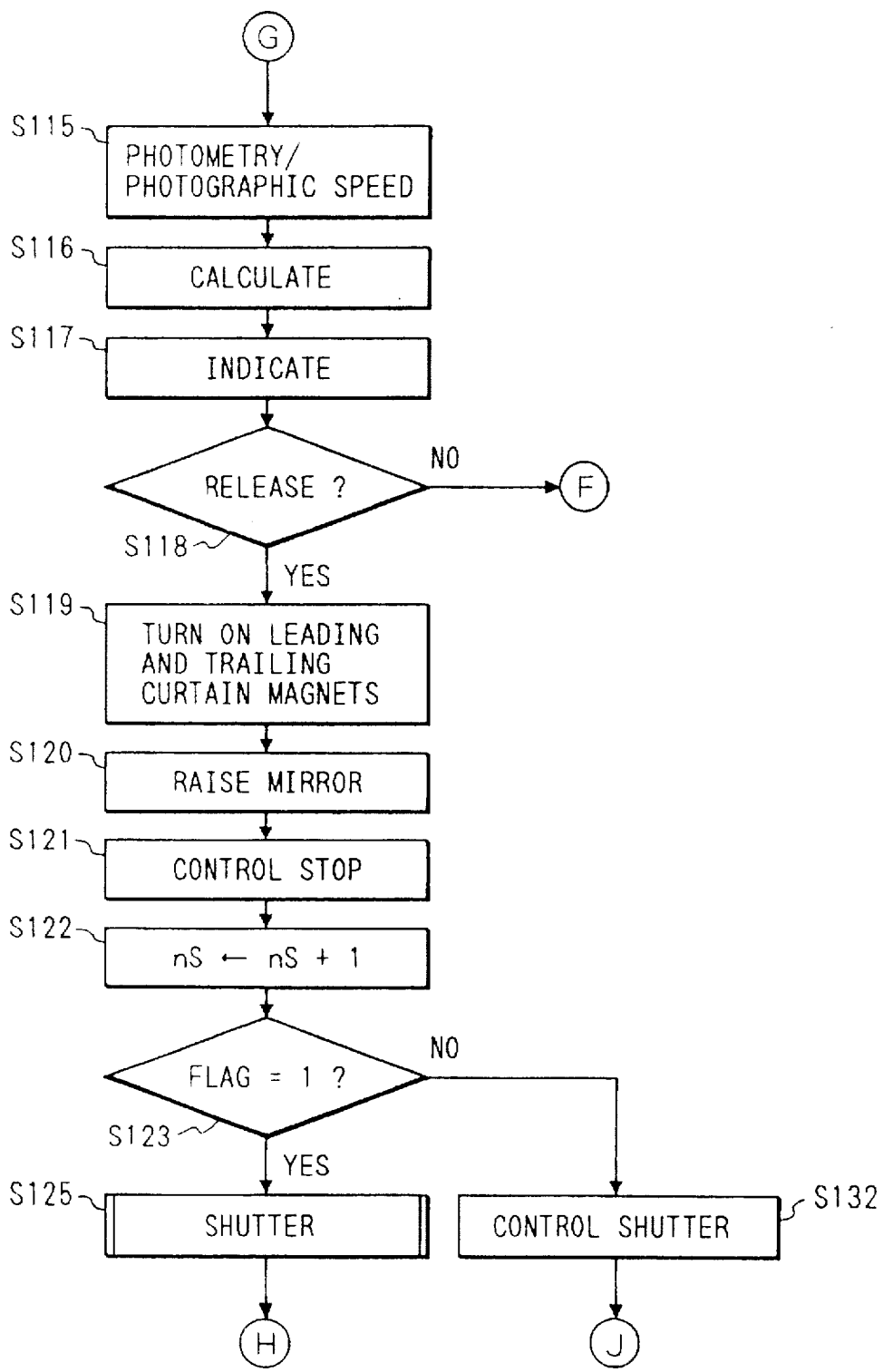
FIG. 17 is a flowchart showing an example of measurement processing of the shutter.
Figure 18:
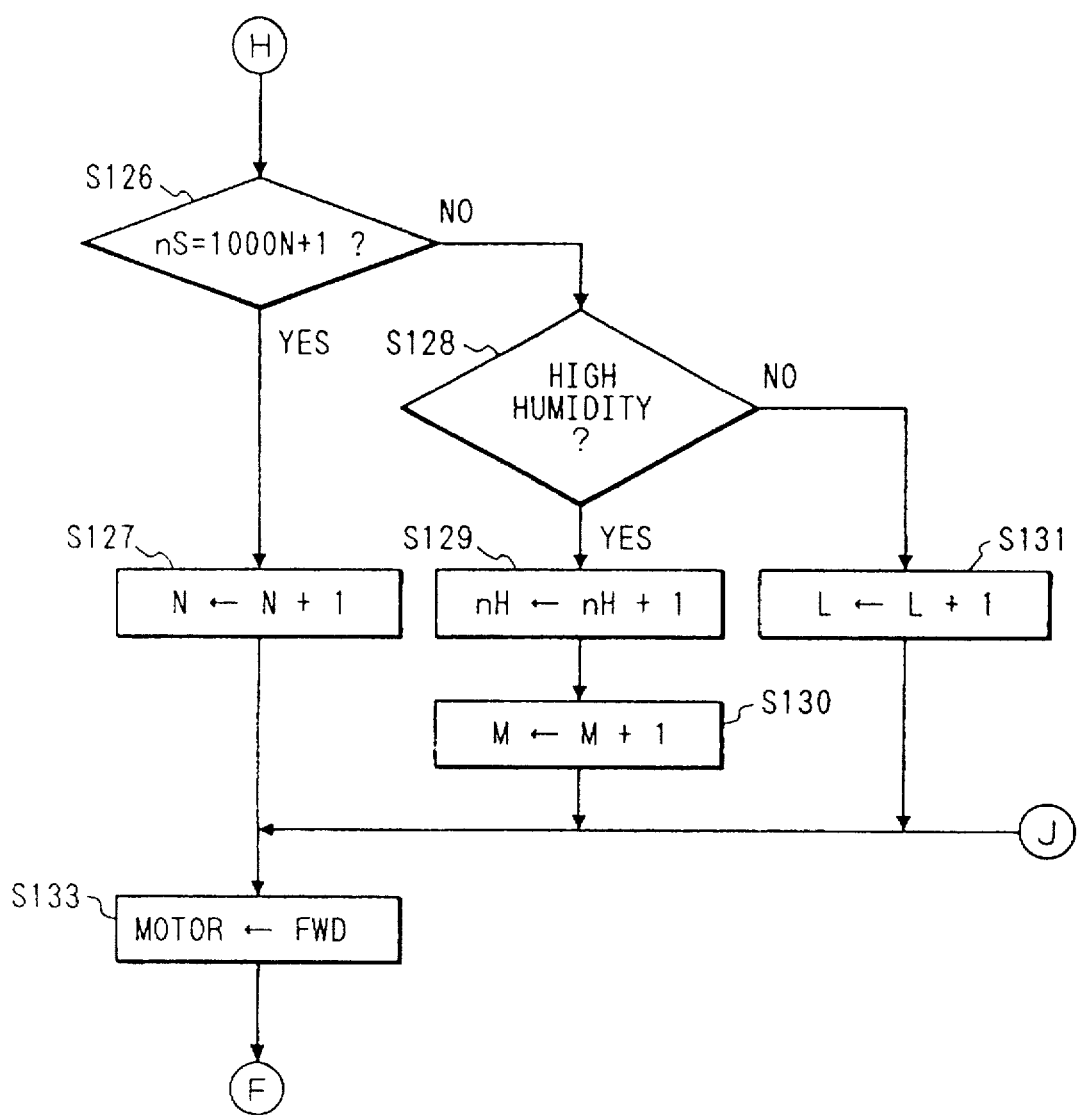
FIG. 18 is a flowchart showing an example of measurement processing of the shutter.

Next, FIGS. 16, 17 and 18 illustrate embodiments in which the measurement in the shutter is automatically executed each time the number of operations of the camera exceeds a fixed number of operations and further with every passage of a given year and month when used under severe conditions.

A count value of the shutter actions as a determining condition for a fixed number of times in use exceeds a predetermined number of times. A count value of the actions at a high humidity as a determining condition under the severe conditions exceeds a predetermined number of times. In this case, setting is done at the same hour in every year as a determining condition of a passage of a fixed year and month.

For the number of shutter actions, the CPU 32 itself counts the number of times to operate the shutter 8. Further, the CPU 32 counts the number of high-humidity actions in view of two conditions of humidity information from the humidity detector 30 and the number of shutter actions. These counted results are each required to be memorized and therefore stored in the memory 31 shown in FIG. 4. Moreover, for the passage of the fixed year and month, the CPU 32 detects date information given from the date detector 29.

The following routine is started with power-on of the CPU 32.

S105: A theretofore shutter operation number nS stored in the memory 31 is read.

S106: Determined is whether or not the shutter operation number nS reaches 1000 times as large as a predetermined value N. When reaching 1000 times, the action proceeds to S111. If not, the action proceeds to S107. As will be stated later, the value N is updated every time the measurement of the shutter exposure time is completed once. It therefore follows that the measurement is executed for every 1000 shutter operations. For instance, when the measurement is effected 1000 times, a next measuring chance is the 4000th time.

S107: Whether or not an environment temperature thereat is equal to or larger than a predetermined value is determined from an output signal of the humidity detector 30. If equal to or larger than the predetermined value, the action proceeds to S108. Whereas if not, the action proceeds to S109.

S108: Determined is whether or not a high-humidity operation number nH stored in the memory 31 reaches 10 times a predetermined value M. As will hereinafter be mentioned, the value M is updated every time the measurement of the shutter exposure time is completed once under high-humidity conditions. It therefore follows that the measurement is executed for every 10 shutter operations under the high-humidity conditions. For instance, when the measurement is effected 30 times, a next measuring chance is the 40th time.

S109: Whether or not year data L stored in the memory 31 is coincident with the present year through the date detector 29 is determined. If coincident, the action proceeds to S110. Whereas if not coincident, the action proceeds to S112.

S110: Whether or not the present month is April is determined. If it is April, the action proceeds to S111. Whereas if not, the action proceeds to S112.

S111: A flag is set to 1. The flag is herein a signal for determining whether an automatic measurement of the shutter is performed or not at a timing which will be stated. The flag is set to 1 if any one item among the shutter operation number, the high-humidity operation number and the year/month data reaches the applicable condition. When the flag is 1, the following measurements are to be executed.

S112: The flag is set to 0. In contrast with S111, if not coincident with any conditions, the flag is set to 0, and no measurement is effected.

S115: The photometric signal and the photographic speed signal are read from the photometric device 26 and the film speed detector 27.

S116: An arithmetic operation is conducted based on the two signals read in S115. A proper exposure condition is thus calculated.

S117: The exposure condition obtained in S116 is displayed on the LCD 34.

S118: Whether or not the release button 10 is depressed is determined through the switch detector 28. If depressed, the action proceeds to S119. Whereas if not depressed, the action returns to S105 wherein the above processes are repeated.

S119: For performing the process to operate the shutter 8, as explained in FIG. 3, the leading and trailing curtain magnets are at first turned on.

S120: The unillustrated reflecting mirror is raised.

S121: The stop 35 is controlled in accordance with the exposure conditions obtained in S116.

S122: The shutter is operated once therefrom. Hence, 1 is added to the shutter operation number nS, and the result is restored in the memory 31.

S123: Flag values set in S111, S112 are determined. If the flag is 1, the action proceeds to S125. Whereas if not 1, the action proceeds to S132.

S125: The shutter exposure time measuring routines described in FIGS. 9, 10, 11 and 12 are executed because of the flag being 1. Processing on the results thereof is done as explained above.

S126: After passing through the shutter exposure time measuring routines, the present step is executed. Determined at first is whether or not the shutter operation number nS reaches 1000 times the predetermined value N and also a 1-added value. If reached, the action proceeds to S127. Whereas if not reached, the action proceeds to S128. This process is the same as S106. The determination is, however, that the shutter exposure time measuring routines are executed for the reason that the shutter operation number reaches 1000 times as large as N.

S127: The exposure time measurement is executed for the reason of the number of shutter operations. Hence, 1 is added to N, and the result is restored in the memory 31. With this process, a next measuring chance is the time when the shutter operation is performed 1000 times more.

S128: It does not mean that the exposure time measurement is executed because the shutter operation number nS does not reach 1000 times the value N and also the 1-added value, i.e., for the reason of the shutter operation number. Accordingly, next, whether or not the exposure time measurement is executed for the reason of a high humidity thereat is determined. If done because of the high humidity, the action proceeds to S129. Whereas if not, the action proceeds to S131.

S129: It has proven that the exposure time measurement is executed because of the operation at the high humidity. Therefore, 1 is added to the high-humidity operation number nH.

S130: The fact that the shutter measurement process is executed due to the high humidity can be known from a state in S129. Accordingly, 1 is added to the predetermined value M. With this process, as a next measuring chance, the shutter measurement in a high-humidity state is thereby done after the shutter has been driven 10 times in the high-humidity state.

S131: The shutter measuring process is performed neither because of the shutter operation number nor because of the high-humidity state number but because of, the predetermined year and month being reached. Accordingly, 1 is added to a predetermined value L. With this process, it follows that the measurement is carried out in the same month of the next year.

S132: As a result of the determination in S123, the flag value is 0, and therefore the shutter operation with no measurement is performed.

S133: The film is fed by rotating the motor 36, and the biasing action of the mechanical system is conducted. Thereafter, the action returns to S105 where the above processes are repeated.

Figure 19:
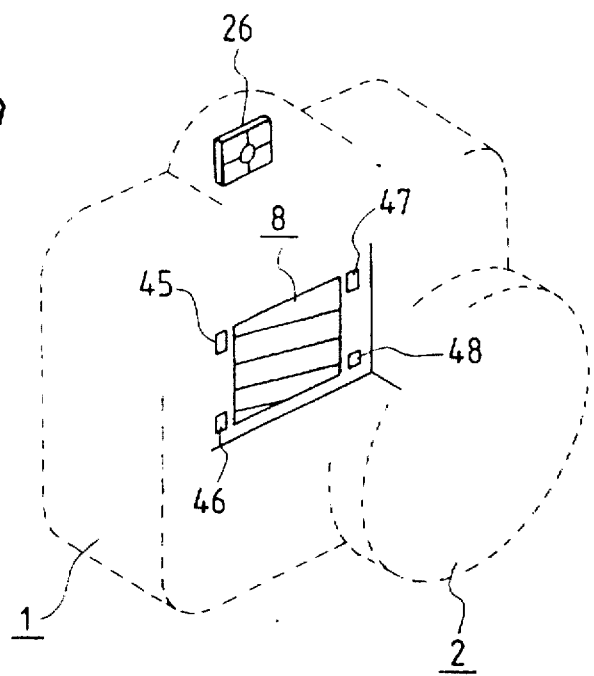
FIG. 19 is a view showing a second embodiment of the shutter measuring apparatus of this invention.

FIG. 19 depicts the shutter 8 in a second embodiment of this invention.

As illustrated therein, the camera 1 in this embodiment has the shutter 8 and a plurality of detection windows 45, 46, 47, 48 formed in the vicinity of the shutter 8 but outwardly of the aperture.

The unillustrated film is exposed to the object light penetrating the lens 2 through the shutter 8. The object light is employed for measuring the exposure time of the shutter 8. More specifically, as will be stated later, four pieces of PTRs are provided in an interior of each of the detection windows 45, 46, 47, 48. The PTRs are disposed so that the beams of light toward them are all intercepted by the leading and trailing curtains of the shutter 8. The object light passing through the lens 2 has a size enough to cover the unillustrated aperture. Hence, beams of extra ambient light thereof are also utilizable for projections on the detection windows 45, 46, 47, 48. Further, the camera 1 is provided with a photometric device 26 including light receiving elements in the vicinity of the finder thereof. The photometric device 26 meters the object light from the lens 2. The photometric device 26 is herein comprised of five pieces of partition photometric elements. The partition photometric elements are used for obtaining respective photometric values by splitting the object light into five components and calculating an optimum exposure condition by use of these photometric values through a predetermined algorithm. This processing content is known, and its detailed explanation will therefore be put aside.

Figure 20:
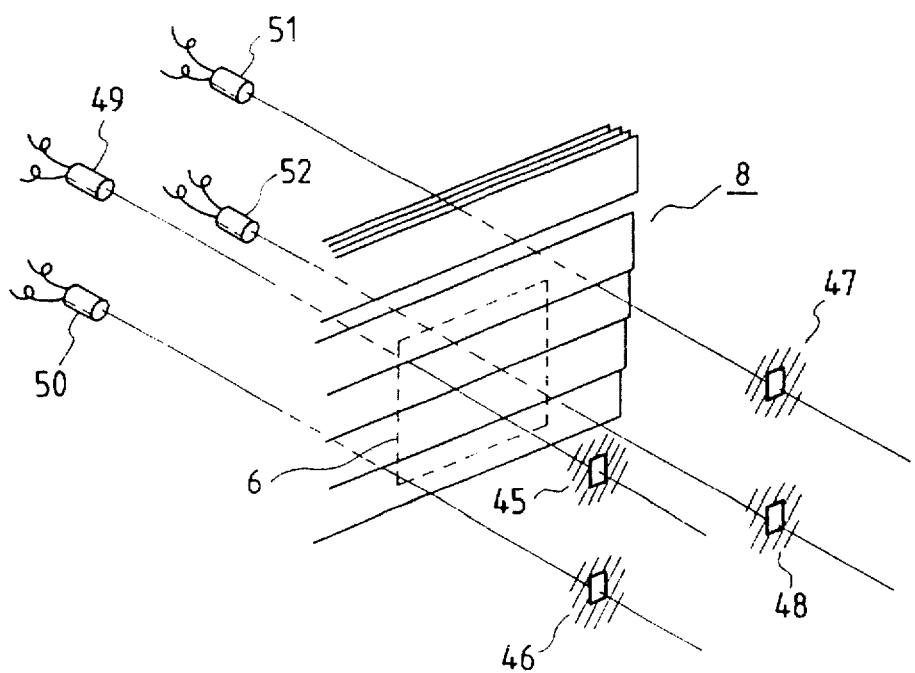
FIG. 20 is a view illustrating a structure of the shutter in detail.

FIG. 20 fully illustrates a detailed layout of the respective curtains of the shutter 8 and PTRs 49, 50, 51, 52 corresponding to the detection windows 45, 46, 47, 48 in the camera 1.

A beam of light passing through the detection window 45 falls on the PTR 49 via each curtain of the shutter 8. Relationships between other three detection windows 46, 47, 48 and the PTRs 50, 51, 52 are the same. The aperture as an exposure area on the film exists inwardly of the respective detection windows 45, 46, 47, 48.

Figure 21:
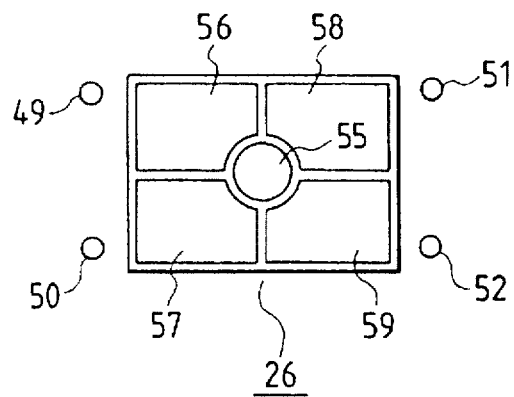
FIG. 21 is a view showing the structure of the shutter in greater detail.

FIG. 21 is a view fully illustrating relative positional relationships of the above photometric device 25 versus the PTRs 49, 50, 51, 52.

As discussed above, the photometric device 26 includes five photometric areas 55, 56, 57, 58, 59. The PTRs 49, 50, 51, 52 are positioned to exist in close proximity to the four areas 56, 57, 58, 59, respectively.

Some of quantity of the object light which is to fall on, e.g., the PTR 49 can be, as will be stated later, predicted beforehand by using a photometric signal of the photometric area 56, depending on layout conditions between the partition photometric areas and the PTRs.

Figure 22:
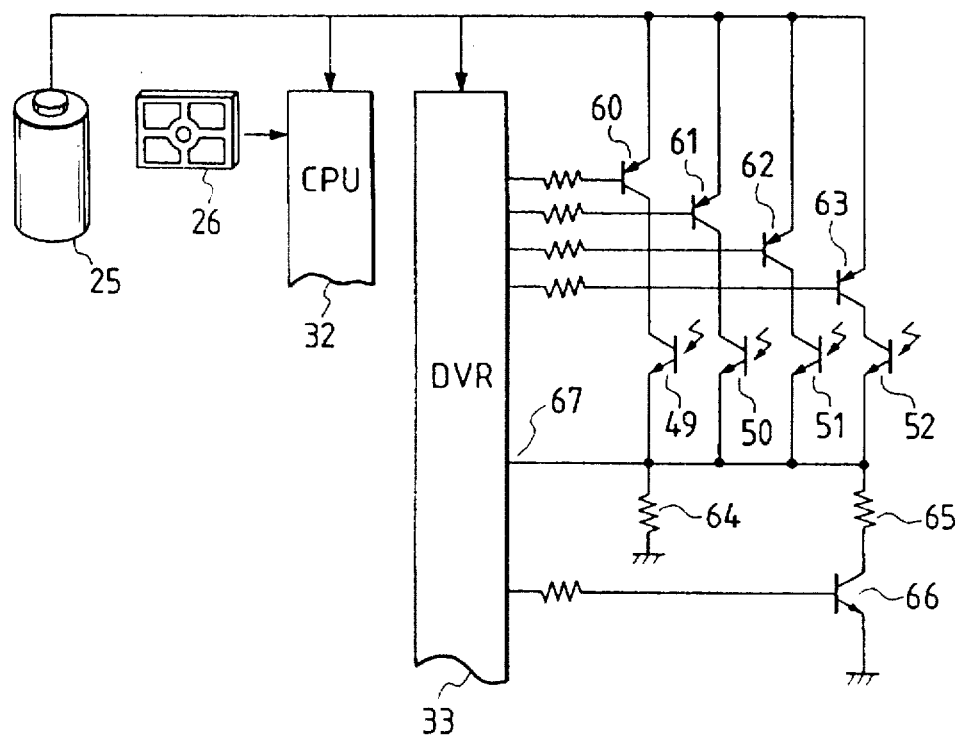
FIG. 22 is a block diagram showing an example of the electric circuit of the camera having the shutter.

FIG. 22 is a block diagram of a circuit of the camera 1 including the above-mentioned devices.

The elements incorporating the same functions as those of FIG. 4 in the first embodiment are marked with the like numerals. Descriptions of the common elements are omitted. The following is a difference from FIG. 4.

The photometric signals of the photometric device 26 are transmitted to the CPU 32. Further, transistors 60, 61, 62, 63 are connected to the PTRs 49, 50, 51, 52 so as to be on/off-controllable independently on the basis of the outputs from this photometric device 26. A photocurrent from each PTR is voltage-converted by a resistor 64 and transmitted to an AD conversion input terminal of the CPU 32.

Moreover, another current/voltage converting resistor 65 is connected in parallel to the resistor 64 by the transistor 66 according to the necessity. As will be stated below, the transistors 60, 61, 62, 63 are used for selecting an optimum PTR from the four PTRs to measure the exposure time of the shutter 8 on the basis of the photometric signals of the photometric device 26. An embodiment which follows presents a method of using the PTR in the vicinity of the brightest area.

Furthermore, the transistor 66 controls the connection of the resistor 64 so that a value of the photocurrent generated from some selected PTR becomes a value optimal to the AD conversion of the CPU 32.

Figure 23:
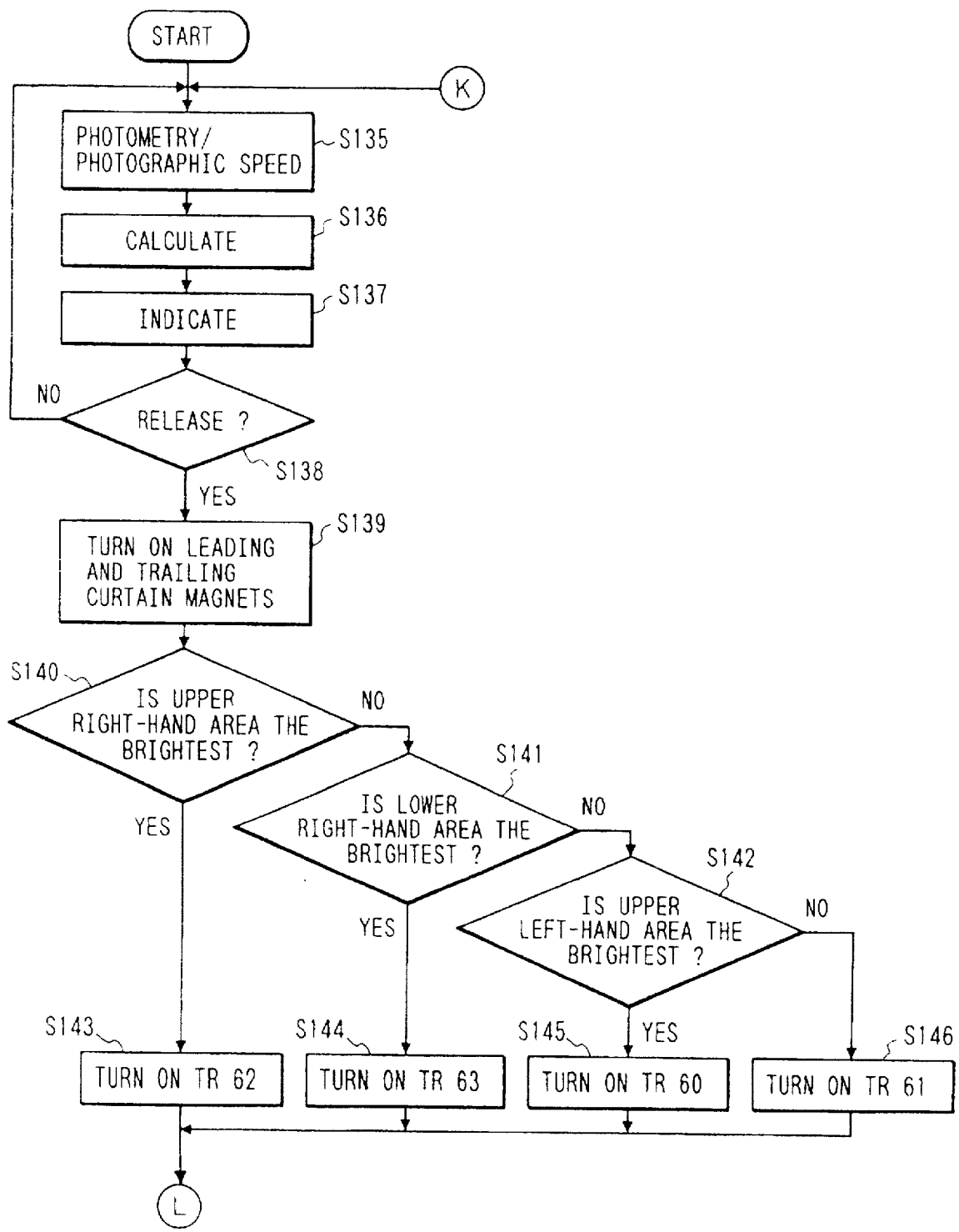
FIG. 23 is a flowchart showing an example of measurement processing of the shutter.
Figure 24:
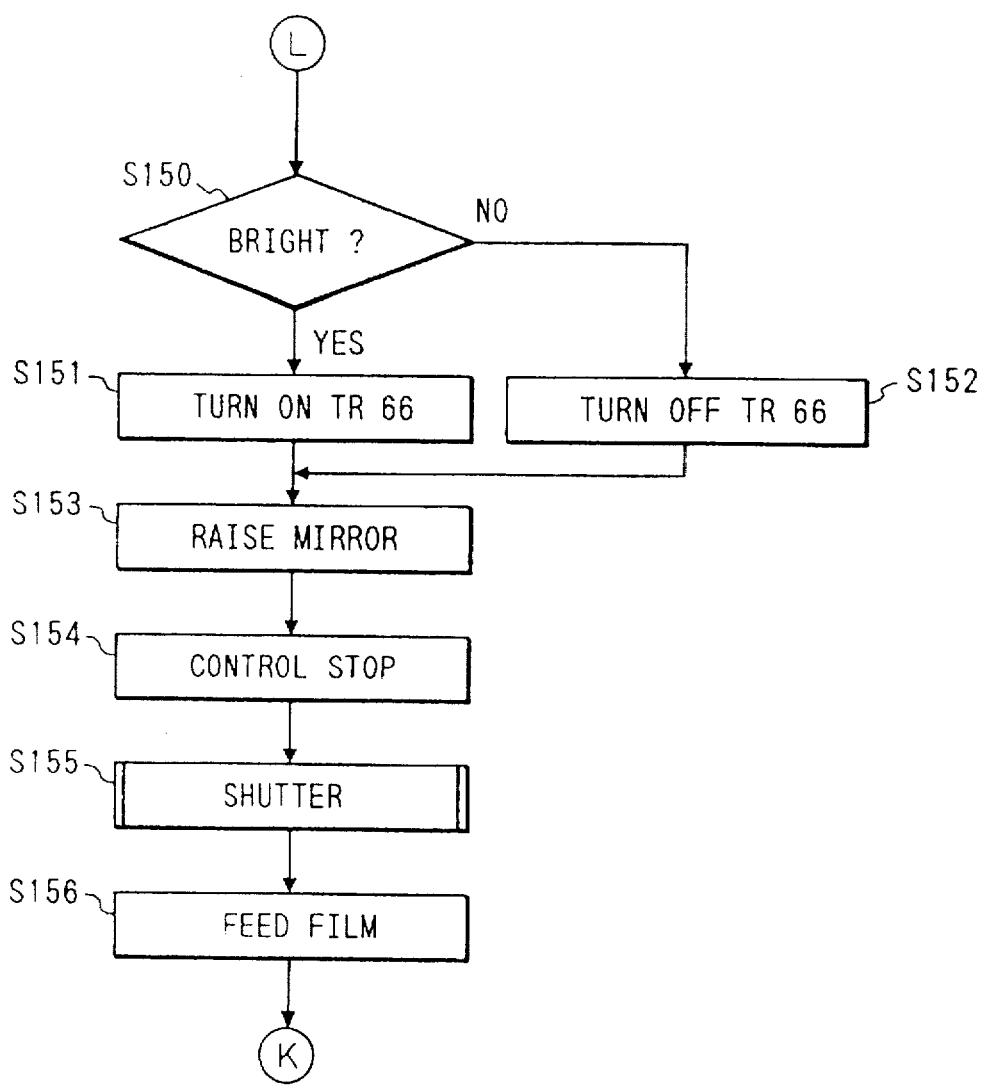
FIG. 24 is a flowchart showing an example of measurement processing of the shutter.

FIGS. 23 and 24 show examples of the processing routine of the CPU 32 in FIG. 22. The operation is started with power-on.

S135: The photometric signal and the photographic speed signal are read from the photometric device 26 and the film speed detector 27.

S136: An arithmetic operation is conducted based on the two signals in S135. A proper exposure condition is thus calculated.

S137: The exposure condition obtained in S136 is displayed on the LCD 34.

S138: Whether or not the release button 10 is depressed is determined through the switch detector 28. If depressed, the action proceeds to S139. Whereas if not depressed, the action returns to S135 wherein the above processes are repeated.

S139: The release button 10 is depressed, and therefore both of the leading and trailing curtain magnets are turned on.

S140: Determined is whether or not an output is generated, this output indicating that a right upper area, i.e., an area 58 is brightest among the respective areas of the photometric device 26. If generated, the action proceeds to S143. Whereas if not, the action proceeds to S141.

S141: Determined is whether or not an output is generated, this output indicating that a right lower area, i.e., an area 59 is brightest among the respective areas of the photometric device 26. If generated, the action proceeds to S144. Whereas if not, the action proceeds to S142.

S142: Determined is whether or not an output is generated, this output indicating that a left upper area, i.e., an area 56 is brightest among the respective areas of the photometric device 26. If generated, the action proceeds to S145. Whereas if not, the action proceeds to S146.

S143: The transistor 62 is turned on, and only the PTR 50 is made active.

S144: The transistor 63 is turned on, and only the PTR 52 is made active.

S145: The transistor 60 is turned on, and only the PTR 49 is made active.

S146: Because of being negative in all of S140, S141, S142, the determination is that a left lower area, i.e., an area 57 among the areas is brightest. Consequently, the transistor 61 is turned on, and only the PTR 50 is made active.

With the above processes of S140–S146, there is selected and electrified the PTR close to the area determined to be brightest by comparing the plurality of outputs of the photometric device 26.

S150: A conversion voltage generated in the resistor 64 is AD-converted. A brightness/darkness state of the output selected by the above process is thus further determined.

As will hereafter be mentioned, if too bright, and when the AD conversion input is excessive, a gain is changed. Reversely if too dark, and when the AD conversion input is too small, the gain is also changed. An adjustment is thereby made so that an optimum voltage amplitude is inputted to an AD conversion input terminal 67 of the CPU 32.

S151: The transistor 66 is turned on because of being too bright. The voltage conversion is effected in the state where the resistor 64 is connected in parallel to the resistor 65.

S152: The transistor 66 is turned off because of being too dark. The voltage conversion is conducted by use of only the resistor 64.

S153: The unillustrated reflecting mirror is raised.

S154: The stop 35 is controlled in accordance with the exposure condition obtained in S136.

S155: Executed is a shutter routine of controlling the exposure on the film by opening and closing the shutter 8. The control thereof is not explained in detail because the routines shown in FIGS. 9 and 10 are usable as they are.

S156: The motor 36 make forward rotations to feed the film, and the biasing action of the mechanism is carried out. Thereafter, the action returns again to S135 wherein the above processes are repeated.

Figure 25:
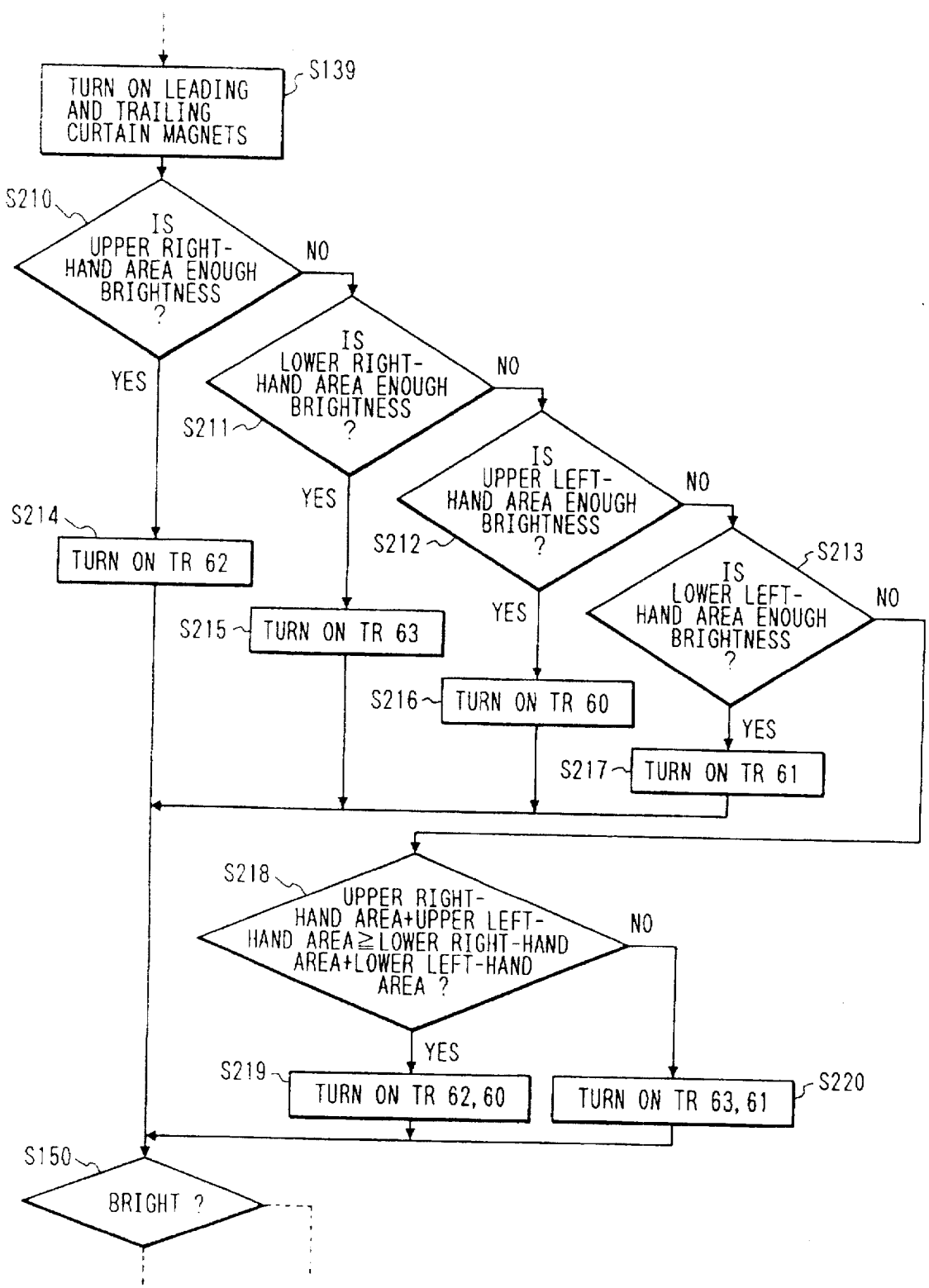
FIG. 25 is a flowchart showing an example of measurement processing of the shutter.

FIG. 25 shows a processing routine in another embodiment of the camera having the structure for making the measurement by directly utilizing the object light explained in FIG. 19.

A problem in the case of directly utilizing the external light is that a quantity of light incident on the PTR is small as the case may be. In such a case, the photocurrent generated is also reduced. The amplitude of the output voltage obtained in the CPU 32 lacks, with the result that the measurement becomes impossible.

The structure and the electric circuit in this embodiment follow those in FIGS. 19 to 22. However, the PTRs 49, 51 and PTRs 50, 52 are accurately so disposed as to be simultaneously shielded by the respective curtains of the shutter 8. Only when the quantity of the incident light lacks, the photocurrents generated by the PTRs 49, 51 or the PTRs 50, 52 are mixed, and the voltage conversion is thus performed. A sufficient voltage amplitude is thereby obtained.

The preset processing routine as shown below is that S139 and S150 in the routine shown in FIG. 23 are connected while deleting S140 through S146.

S210: Whether or not a luminance of the right upper photometric area 58 assumes a level enough for the measurement is determined. If enough, the action proceeds to S214. Whereas if not enough, the action proceeds to S211.

S211: Whether or not the luminance of the right lower photometric area 59 assumes a level enough for the measurement is determined. If enough, the action proceeds to S215. Whereas if not enough, the action proceeds to S212.

S212: Whether or not the luminance of the left upper photometric area 56 assumes a level enough for the measurement is determined. If enough, the action proceeds to S216. Whereas if not enough, the action proceeds to S213.

S213: Whether or not the luminance of the left lower photometric area 57 assumes a level enough for the measurement is determined. If enough, the action proceeds to S217. Whereas if not enough, the action proceeds to S218.

S214: The right upper luminance has the level enough for the measurement, and therefore only the transistor 62 is turned on.

S215: The right lower luminance has the level enough for the measurement, and hence only the transistor 63 is turned on.

S216: The left upper luminance has the level enough for the measurement, and therefore only the transistor 60 is turned on.

S217: The left lower luminance has the level enough for the measurement, and hence only the transistor 61 is turned on.

S218: All of the brightnesses of the respective PTRs are solely insufficient for the measurement. Hence, the upper brightness added with the photocurrents through the right upper and left upper PTRs 51, 49 is compared in terms of magnitude with the lower brightness added with the photocurrents through the right lower and left lower PTRs 52, 50. If the upper brightness is higher, the action proceeds to S219. Whereas if not higher, the action proceeds to S220.

S219: The two transistors 62, 60 are simultaneously turned on because the upper part is brighter. Consequently, it follows that the photocurrents of the PTRs 49, 51 are added.

S220: The two transistors 63, 61 are simultaneously turned on because the lower part is brighter. Consequently, it follows that the photocurrents of the PTRs 50, 52 are added.

After the above processes have been done, the action is subsequent to the routine continuing from S150 shown in FIG. 23.

Incidentally, there exists a limit in such a strict layout that the respective curtains of the shutter 8 simultaneously shield the PTRs 49, 51 or the PTRs 50, 52. In this case, an allowable range of Tmax, Tmin determined after the above-mentioned may be expanded.

Figure 26:
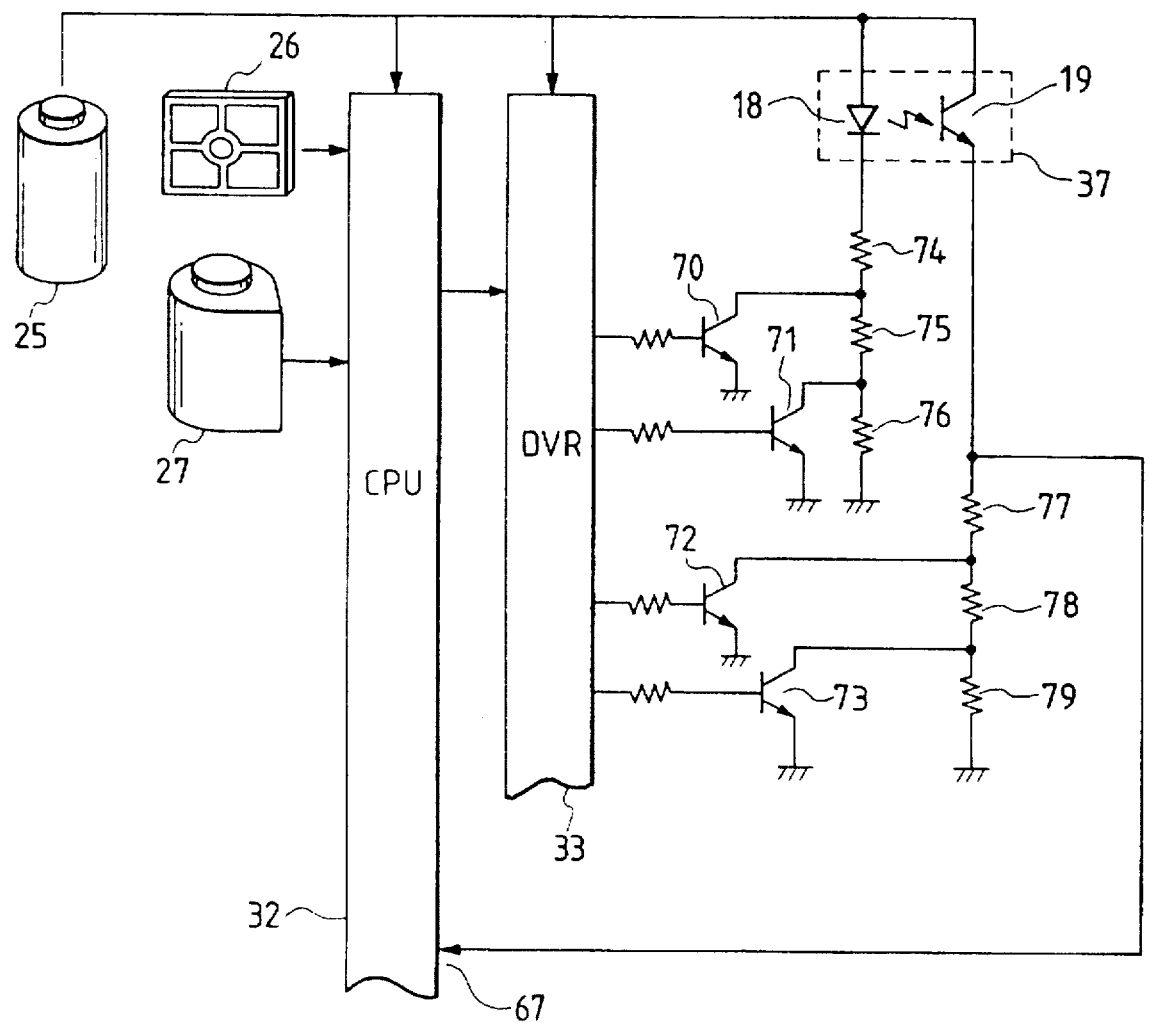
FIG. 26 is a block diagram of the electric circuit in a third embodiment of the shutter measuring apparatus of this invention.

Next, FIG. 26 is a block diagram of a circuit of the camera in a third embodiment of this invention.

A basic structure of the camera 1 involves an application of the structure of FIG. 1 for simplifying the explanation. The structure may be, however, combined with those of the embodiments other than this.

As already discussed in the camera 1 illustrated in FIG. 1, the LED 18 as a light emitting source is lighted up when measuring the exposure time of the shutter 8. There is, however, a possibility wherein the light of this LED 18 becomes stray light, and the film existing in the vicinity thereof is to be irradiated with the stray light. The LED 18 used has a wavelength of near infrared area. Therefore, a problem in terms of a light leakage is small in the case of using an ordinary film. The LED 18 is disposed inwardly of the shutter 8, and hence this problem is essentially inevitable. Further, this drawback becomes more conspicuous with a higher film speed in use or with a slower set shutter speed and a longer opening time of the aperture 6. According to the camera shown in the embodiment 2, however, the exposure time is measured by utilizing the photographing light, so that the problem described above never happens.

In accordance with the present embodiment which goes as below, the following steps are taken for avoiding an influence of the stray light on the film. The condition of use is classified into three cases where no film is loaded, a high photographic speed film is loaded, and the shutter speed is slow. The luminance, i.e., an applied current of the LED 18, is made variable in the above sequence. Further, for the reason given above, the current/voltage converting device through the PTRs is also interlocked for avoiding the drawback in terms of detection due to the fact that the luminance of the LED 18 varies.

Paying attention to FIG. 26, the elements incorporating the same functions as those in FIG. 4 are marked with the like numerals, and their explanations are omitted. With respect to a driving current of the LED 18, a combination of current limit resistors 74, 75, 76 is selected by controlling transistors 70, 71. The luminance of the LED 18 decreases with a larger number of combinations of the resistors 74, 75, 76 in series.

As explained above, when changing the combination of the current limit resistors 74, 75, 76, the photocurrent outputted from the PTR 19 relatively varies. Accordingly, the combination of resistors 77, 78, 79 for converting the photocurrents into voltages has to be selected by controlling the transistors 72, 73.

For instance, if no film is loaded, videlicet, if under such a condition to permit the LED 18 to be driven at the maximum luminance with no necessity for an anxiety about the light leakage, the transistors 70, 72 are simultaneously turned on. The LED 18 can be driven by only the resistor 74. At this time, the photocurrent from the PTR 19 is maximized and therefore advantageous. Reversely, however, for preventing a saturation of the AD conversion input voltage, the transistors 72, 73 are simultaneously turned on. The voltage conversion can be done by only the resistor 77, whereby an SN ratio is set under an optimum condition.

Contrastingly, if the high photographic speed film is employed, i.e., when trying to prevent the light leakage from the LED 18 as much as possible, all of the transistors are turned off. The driving current of the LED 18 is minimized by arranging the resistors 74, 75, 76 in series. Reversely, the photocurrent generated from the PTR 19 decreases correspondingly. Hence, the transistors 72, 73 are simultaneously turned off, and a voltage obtained by arranging the resistors 77, 78, 79 in series is made optimal to the AD conversion input terminal 67.

Figure 27:
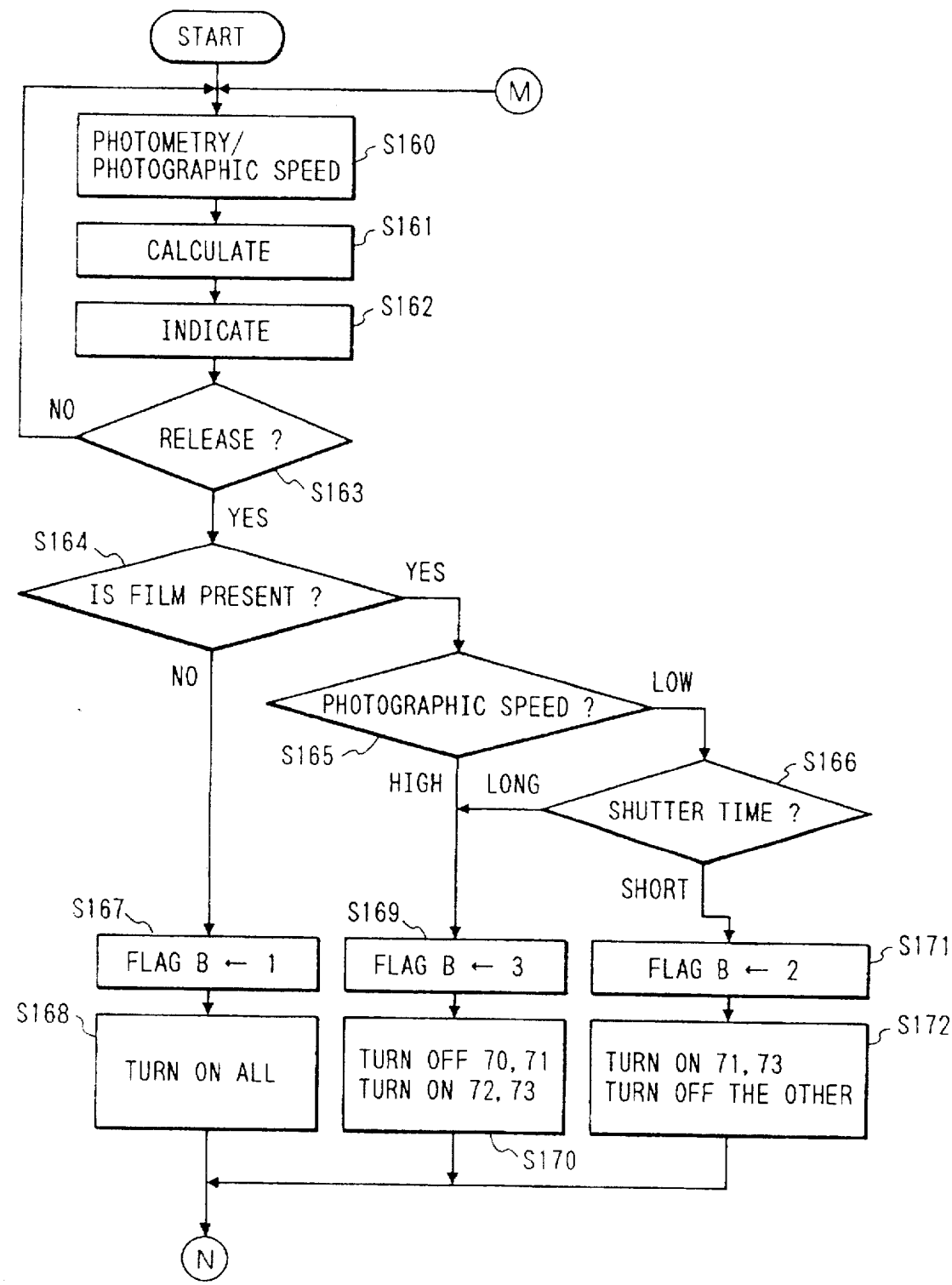
FIG. 27 is a flowchart showing an example of measurement processing of the shutter.
Figure 28:
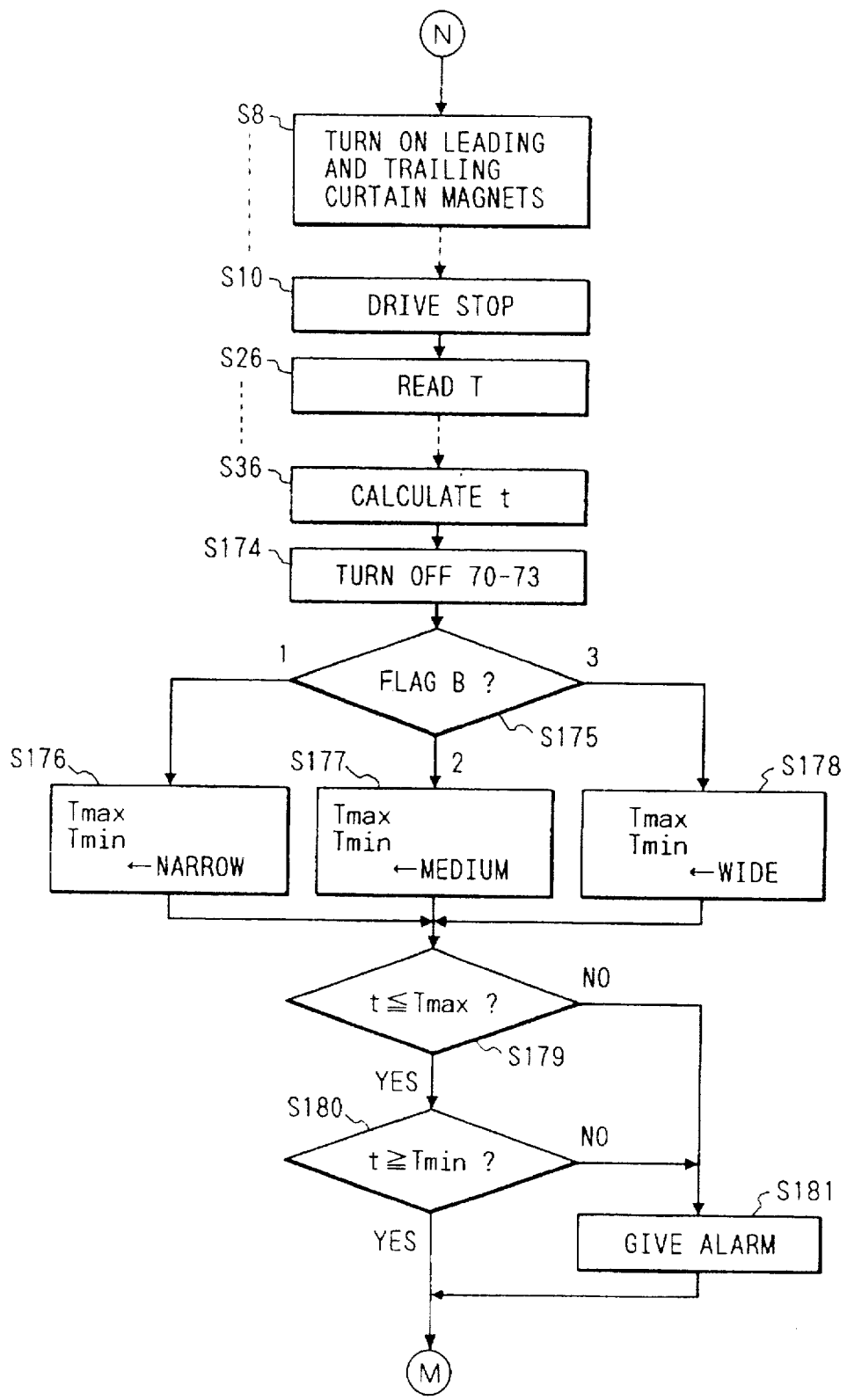
FIG. 28 is a flowchart showing an example of measurement processing of the shutter.

FIGS. 27 and 28 show processing routines of the CPU 32 which correspond to the circuit block diagram of FIG. 26. The operation starts with power-on.

S160: The photometric signal and the photographic speed signal are read from the photometric device 26 and the film speed detector 27.

S161: An arithmetic operation is conducted based on the two signals read in S160. A proper exposure condition is thus calculated.

S162: The exposure condition obtained in S161 is displayed on the LCD 34.

S163: Whether or not the release button 10 is depressed is determined. If depressed, the action proceeds to S164. Whereas if not depressed, the action returns to S160 wherein the above processes are repeated.

S164: Whether or not the film is loaded is determined. If loaded, the action proceeds to S165. Whereas if not loaded, the action proceeds to S167.

S165: Whether the loaded film is high of photographic speed is determined. If high, the action proceeds to S169. If not, the action proceeds to S166. A fiducial value for determining whether or not the film exhibits the high photographic speed is empirically set depending on a degree of light leakage that is determined from an arrangement position of the LED 18. For example, ISO1000 is the fiducial value.

Excepting the method of determining based on the photographic speed value, a method of determining whether the film is an infrared film or not may also be taken. As discussed above, it is because the problem in terms of the light leakage is small when using the ordinary film as the LED 18 to be used has the wavelength of the near infrared area. The present embodiment has shown only the way of determining the photographic speed.

S166: The determination is that the film speed is low. Accordingly, whether the set shutter speed is slow or not is next determined. If the shutter speed is slow, the action proceeds to S169. Whereas if the shutter speed is high, the action proceeds to S171.

S167: No film is loaded, and, therefore, 1 is set to a luminance flag B. This implies that it is a preferable condition for the measurement because of no film being loaded even if anxious about the light leakage.

S168: As explained above, the transistors 70, 71, 72, 73 are turned on, whereby the LED 18 can be driven with the maximum current.

S169: 3 is set to the luminance flag B. This implies that the largest condition is the influence exerted by the light leakage.

S170: As discussed above, the transistors 70, 71 are turned off, whereas the transistors 72, 73 are turned on. The LED 18 can be thereby driven with the minimum current.

S171: 2 is set to the luminance flag B. This implies that the influence by the light leakage represents a mid-state between the luminance flags B1 and B2.

S172: Only the transistors 71, 73 are turned on. The LED 18 can be driven in the former mid-state.

Thereafter, as illustrated in FIG. 28, there are executed the processes from S8 to S10 which have already been explained in FIG. 6 and the processes from S26 to S36 which have been explained in FIGS. 9 and 10. Executed is a control process based on the shutter speed T and a process of obtaining the measurement value t thereat.

S174: All of the transistors 70 through 73 are turned off. The currents consumed by the PTR 19 and the LED 18 are minimized. This embodiment does not involve the use of the circuit, explained in FIG. 4, for making complete the operations of the LED 18 and the PTR 19. It is because the currents flowing in the LED 18 and PTR 19 are ignorable with respect to a consumed current of the battery if all of the transistors 70 through 73 are turned off. If not ignorable, a transistor capable of completely cutting off the current may be further provided.

S175: The luminance flags B set in S167, S169, S171 are regenerated to make three kinds of determinations. When the luminance flag B is 1, the action proceeds to S176. When the flag B is 2, the action proceeds to S177. When the flag B is 3, the action proceeds to S178.

S176: The luminance flag B is 1, videlicet, the LED 18 is driven with the maximum luminance. Consequently, the photocurrent from the PTR 19 comes to the maximum, and an output response speed is brought into the best state. Accordingly, rising and falling waveforms of the pulse signal obtained become steep. A luminance of the measurement value t obtained in the CPU 32 also comes into the best state. The shutter speed allowable range of Tmax, Tmin is therefore narrowed down most.

S177: The luminance flag is 2, i.e., the LED 18 is driven with an intermediate luminance. The shutter speed allowable range of Tmax, Tmin is set wider than in S176 but set to an intermediate value smaller than in S178 which will be stated later.

S178: The luminance is 3, viz., the LED 18 is driven with the minimum luminance. The photocurrent from the PTR 19 is accordingly minimized, and its output response speed is brought into the worst state. Namely, in contrast with S176, the waveform obtained becomes gentle. An accuracy of the measurement value t obtained in CPU 32 is also brought into the worst state. Hence, the shutter speed allowable range of Tmax, Tmin is set widest.

S179: The actually measured exposure time t is compared with the allowable maximum value Tmax of the control time T. If over the maximum value, the action shifts to S181.

S180: The actually measured exposure time t is compared with the allowable minimum value Tmin of the shutter speed T to be controlled. If under the minimum value, the action shifts to S181.

S181: Given is an alarm saying that the exposure time exceeds the allowable limits by, as explained in FIG. 5, flashing the segment 43. An alarming method is not mentioned in detail. However, the alarm may be given as explained in S40, S43.

Thereafter, the action shifts to S160, and the above processes are repeated.

Figure 29:
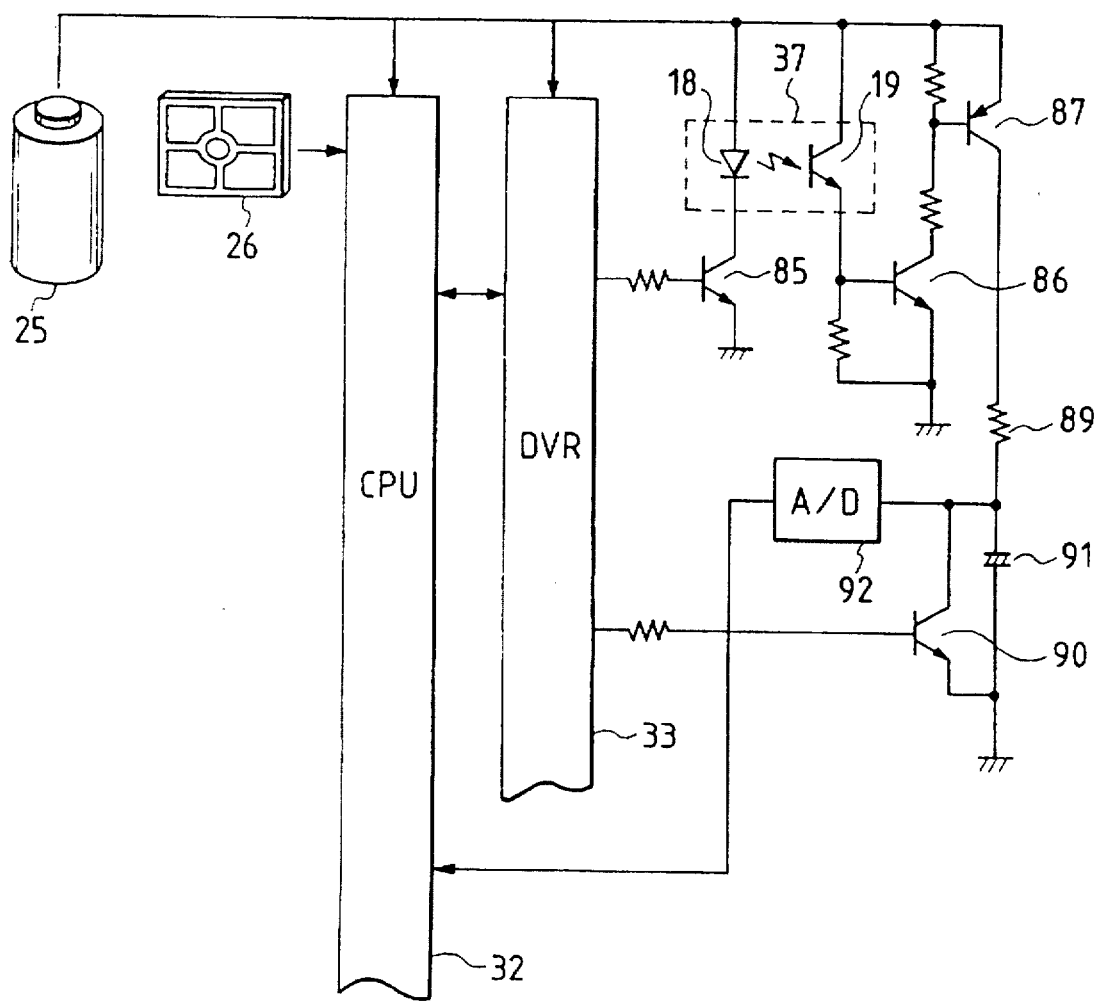
FIG. 29 is a block diagram of the electric circuit in a fourth embodiment of the shutter measuring apparatus of this invention.

FIG. 29 shows a fourth embodiment of the measuring circuit of the shutter 8 according to this invention. The construction of the camera including the shutter 8 is exemplified by FIG. 1.

In each of the first to third embodiments discussed above, as explained in, e.g., FIG. 3, a rise 22 and a fall 23 of the signal from the PTR 19 are detected. A time interval t therebetween is measured, thus obtaining the actual shutter speed. In accordance with this embodiment, however, the attention is paid to the fact that a generating time of the photocurrent from the PTR 19 corresponds to the shutter speed. That is, the photocurrents generated are stored in the form of voltages in a capacitor. A quantity thereof is AD-converted, thereby obtaining an opening time of the shutter.

Referring to FIG. 29, the elements incorporating the same functions as those in FIG. 4 are marked with the like numerals, and the explanations thereof are omitted.

The LED 18 emits the light when turning on a transistor 85. The photocurrent is generated from the PTR 19 during the exposure through the leading and trailing curtains of the shutter 8. The photocurrent is amplified by a transistor 86, and thereafter a transistor 87 is driven in a switching mode.

A capacitor 91 is charged with the current via a resistor 89 while the transistor 87 is kept on. Accordingly, a terminal voltage of the capacitor 91 has a correlation with the time for which the PTR 19 receives the light from the LED 18. That is, the terminal voltage of the capacitor 91 increases with a slower shutter speed. Reversely, the terminal voltage of the capacitor 91 decreases with a higher shutter speed.

Then, the voltage of the capacitor 91 is converted into a digital signal by means of an AD converter 92. Further, a shutter speed of the shutter 8 is obtained by predetermined processing in the CPU 32. It follows that information corresponding to the shutter speed is obtained.

Discharging is effected at both of the terminals of the capacitor 91 just before tripping the shutter 8, and it is required that the previous shutter speed information be erased. For this reason, the transistor 90 is turned on for a short duration at least just before tripping the shutter 8 and thus gets ready for a new measurement.

Referring to FIG. 29, the capacitor 91 is charged with the electricity via the resistor 89. As known well, a charging time is therefore in a logarithmic relationship with the terminal voltage. Accordingly, the processing by the CPU 2 is set to restore the shutter speed by effecting an inverse logarithmic conversion of the obtained voltage of the capacitor 91.

If, though not illustrated, a constant current circuit is employed in place of the charging resistor 89, it is possible to set the charging time and the voltage in a linear relationship. The processing by the CPU 32 will be thereby comparatively simplified.

Besides, if the aperture 6 opens longer with a slower shutter speed, or if the photographic speed of the film loaded is high, the possibility of causing a leakage of the light from the LED 18 increases, correspondingly. The present embodiment therefore includes a flowchart in which the measuring action is not performed if the shutter speed to be controlled is slow, or if the photographic speed of the film to be used is high.

Figure 30:
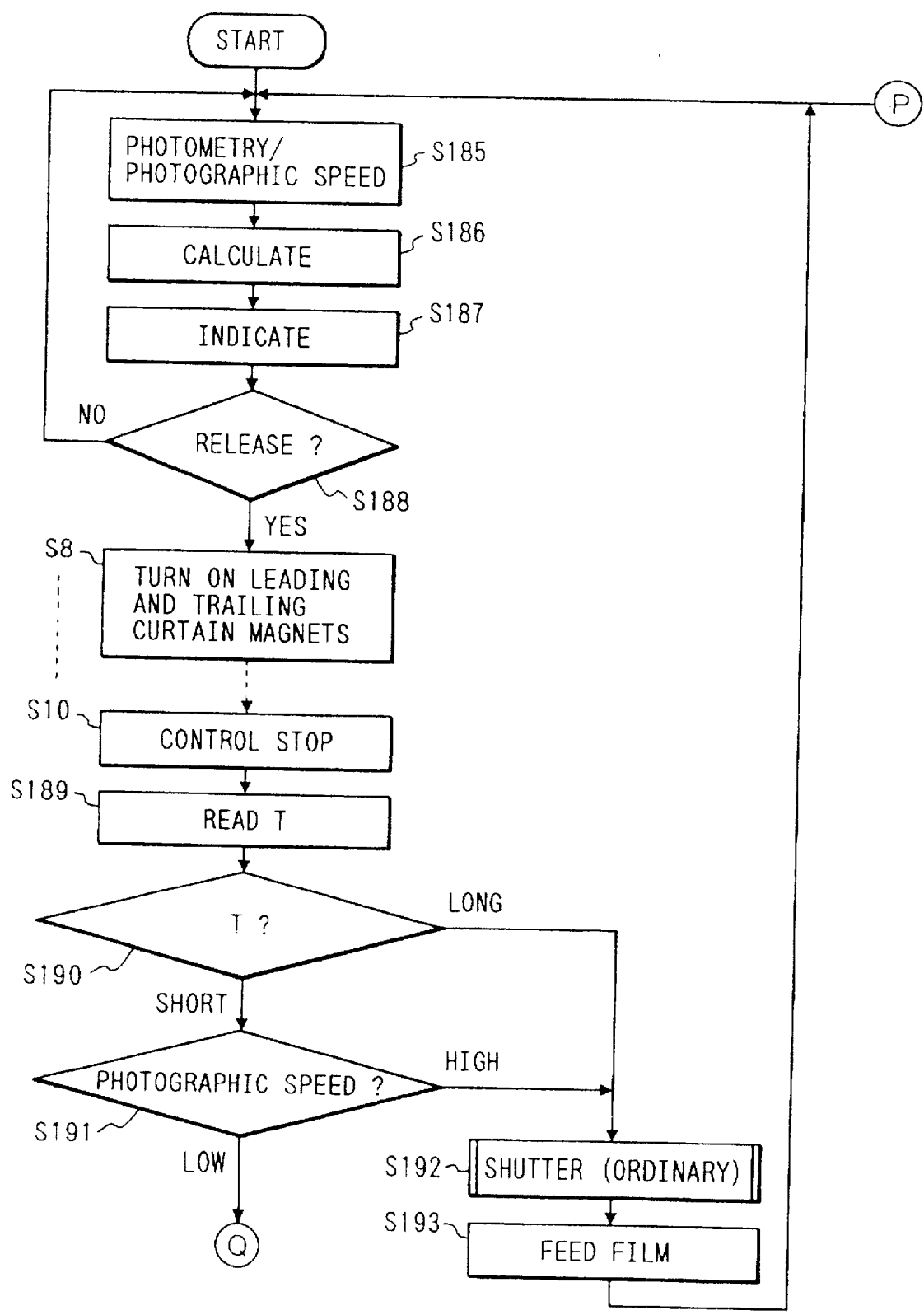
FIG. 30 is a flowchart showing an example of measurement processing of the shutter.
Figure 31:
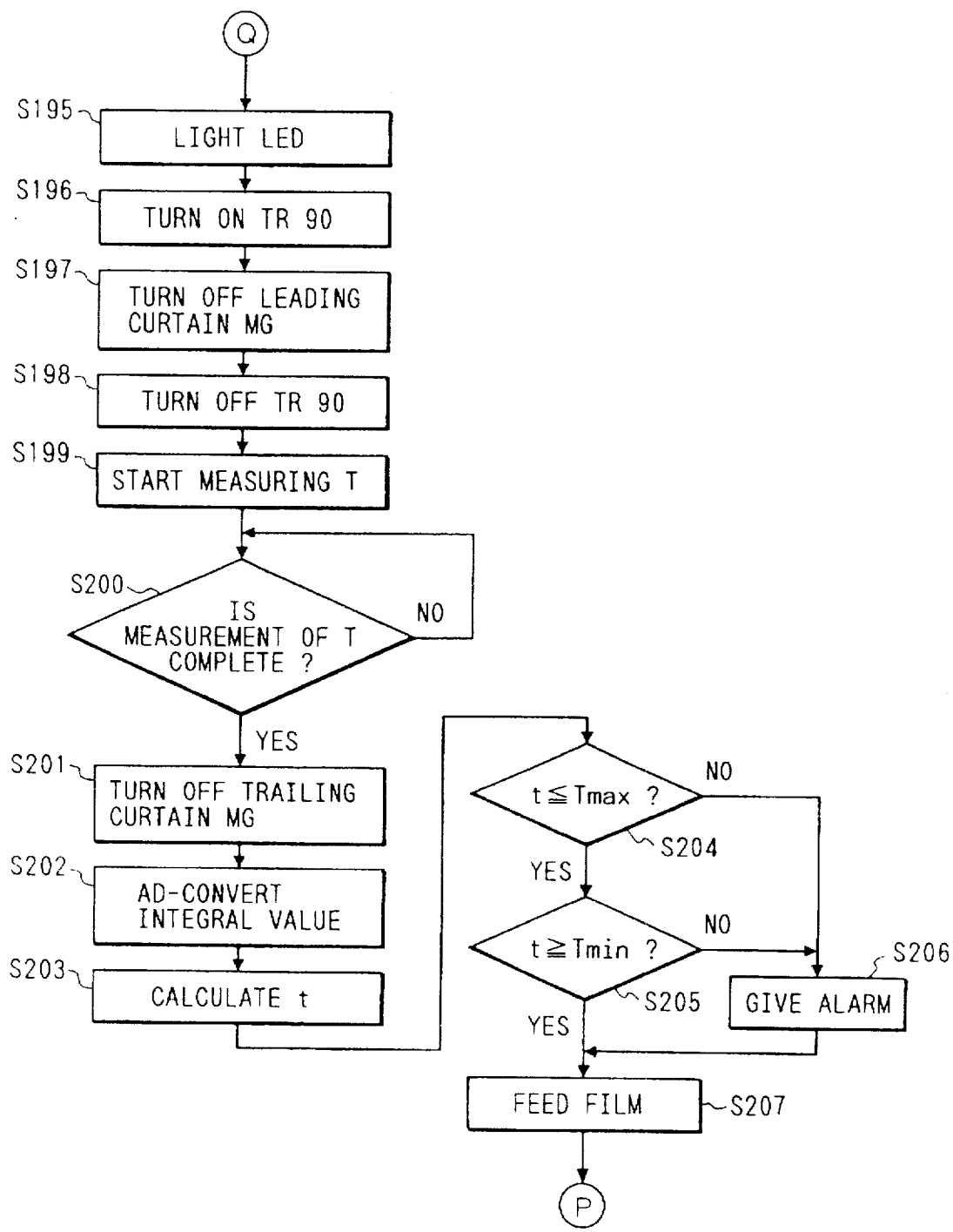
FIG. 31 is a flowchart showing an example of measurement processing of the shutter.

FIGS. 30 and 31 show examples of the routine of the CPU 32 for executing the above processes.

S185: The photometric signal and the photographic speed signal are received from the photometric device 26.

S186: An arithmetic operation is conducted based on the two signals. A proper exposure condition is thus calculated.

S187: The exposure condition obtained is displayed on the LCD 34.

S188: Whether or not the release button 10 is depressed is determined. If not depressed, the action returns to S185 wherein the above processes are repeated.

Thereafter, the processes from S8 to S10 which have already been explained in FIG. 6 are carried out, and the action proceeds to S189.

S189: Read is the control shutter speed T calculated by the arithmetic operation in S186.

S190: Whether or not the control shutter speed T is slower than the fiducial speed is determined. If slower, the action proceeds to S192. Whereas if higher, the action proceeds to S191.

S191: Whether or not the photographic speed of the loaded film is higher than the fiducial value is determined. If higher, the action proceeds to S192. Whereas if lower, the action proceeds to S195.

S192: The control shutter speed is slow, or alternatively the film speed is high. The opening/closing actions of the shutter are executed under normal control. Namely, there is herein effected no process of measuring the shutter speed at which the LED 18 is lighted up.

S193: Film feeding is executed by rotating the motor. The biasing action of the mechanical system is also executed. Then, the action returns to S185 wherein the above processes are repeated.

S195: The determination is that the shutter speed is relatively high, and the film speed is relatively low. Hence, the transistor 85 is at first turned on to light up the LED 18.

S196: The transistor 90 is turned on, and electric charges in the capacitor 91 is discharged.

S197: The leading curtain magnet is turned on, thereby tripping the leading curtain of the shutter 8.

S198: The transistor 90 is turned off to get ready for receiving a signal relative to the shutter speed from the PTR 19.

S199: Counting the control shutter time T is started.

S200: An end of counting is awaited.

S201: Counting is finished, so that the trailing curtain magnet is released. The trailing curtain of the shutter 8 is thereby tripped. For the above exposure time, the light from the LED 18, as described above, falls on the PTR 19, the capacitor 19 is thereby charged with the electricity.

S202: The AD converter 92 AD-converts the terminal voltage of the capacitor 91 into a digital signal which is then transmitted to the CPU 32.

S203: A predetermined logarithmic process is effected, thereby converting the AD-converted signal relative to the voltage into an actual shutter speed t.

S204: The measurement time t is compared with the allowable maximum value Tmax of the control shutter speed T. If over the maximum value, the action shifts to S206.

S205: The actually measured exposure time t is compared with the allowable minimum value Tmin of the control shutter speed T. If under the minimum value, the action shifts to S206.

S206: Given is an alarm saying that the exposure time exceeds the allowable limits by, as explained in FIG. 5, flashing the segment 43.

S207: Film feeding is executed by rotating the motor. The biasing action of the mechanical system is also executed.

Thereafter, the action returns to S185 wherein the above processes are repeated.

Figure 32:
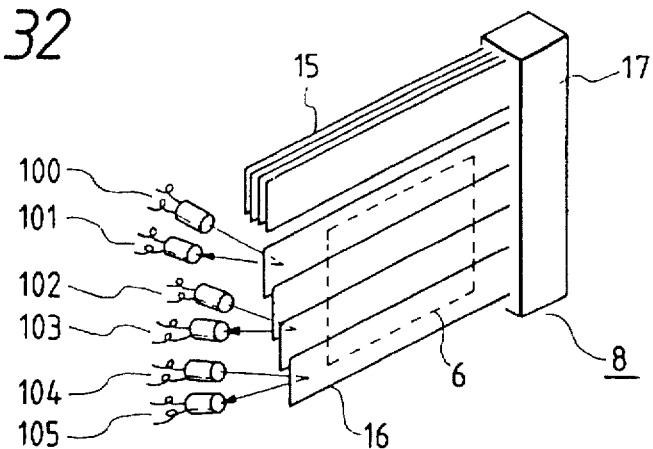
FIG. 32 is a view illustrating a fifth embodiment of the shutter measuring apparatus of this invention.

FIG. 32 illustrates a fifth embodiment of the shutter 8 according to this invention.

The operating sequence of the leading/trailing curtains 16, 15 and the block 17 is basically the same as that in the shutter 8 which has already been explained in FIG. 2. A difference therebetween is that the shutter 8 incorporates, as shown in the FIGURE, three sets of detectors constructed of LEDs 100, 102, 104 and PTRs 101, 103, 105. Beams of light from the LEDs 100, 102, 104 are reflected by the respective curtains 15, 16 and incident on the PTRs 101, 103, 105. Existences of the curtains 15, 16 are thereby detectable at a substantially upper end part (hereinafter termed a proximal part), a substantially central part (termed a mid-part) and a substantially lower end part (termed a distal part) of the aperture 6.

Figure 33:
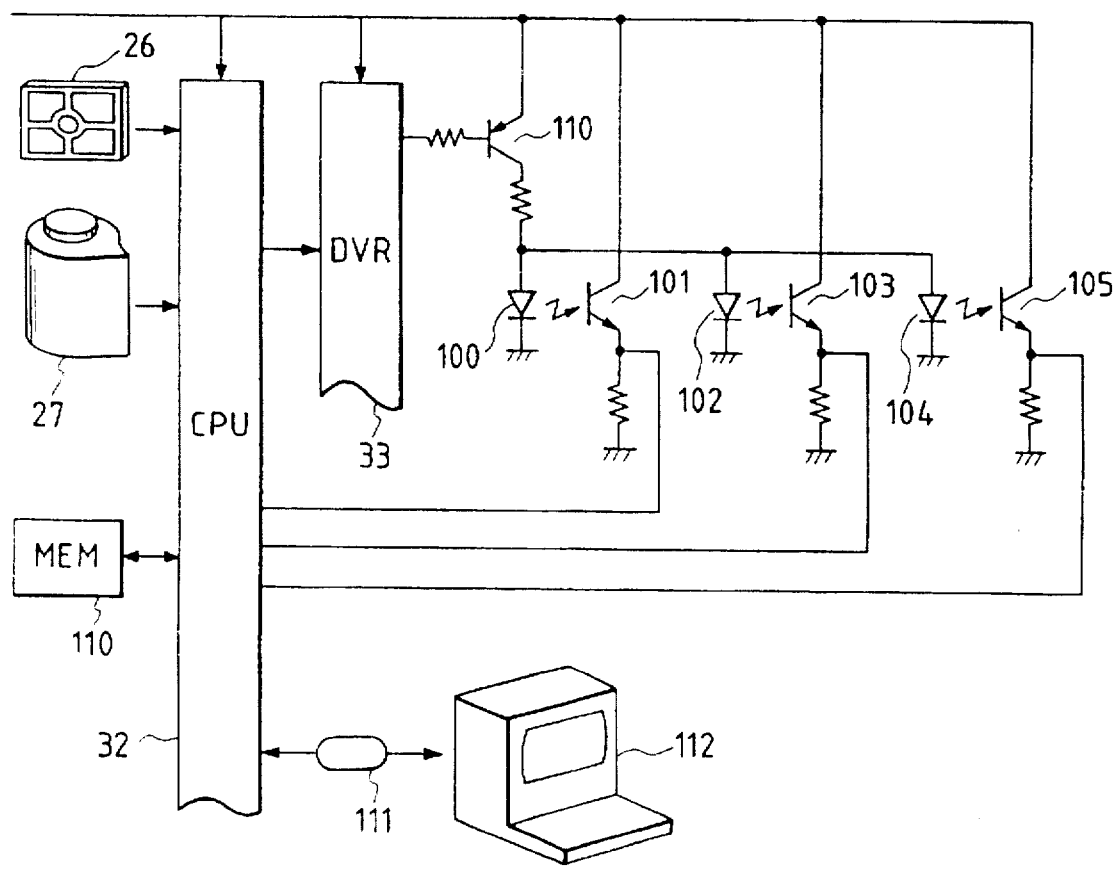
FIG. 33 is a block diagram showing an example of the electric circuit for operating the shutter of FIG. 32.

FIG. 33 shows an embodiment of the electric circuit block of the camera 1 in accordance with this embodiment.

The basic configuration follows the configuration in FIG. 4. The central control is executed by the CPU 32. Further, the photometric device 26 measures a brightness in each of a plurality of partitioned areas of the object. A plurality of photometric values are outputted to the CPU 32. In addition, the film speed detector 27 reads code signals given to a side surface of the loaded film Patrone. Film speed information is inputted to the CPU 32.

A driver 33 has, in addition to the already-mentioned exposure and display functions, a function to light up the LEDs 100, 102, 104 through a transistor 110. Beams of light therefrom are voltage-converted by the PTRs 101, 103, 105 and transmitted to the CPU 32. A memory 110 is a device for storing actually-measured shutter time data measured by the CPU 32. The memory 110 also incorporates a function to transfer the data stored therein back to the CPU 32 according to the necessity. The CPU 32 transmits the data stored in the memory 110 to an external computer 112 via a connector 111. The external computer 112 checks the operation of the camera and is connected to the camera as the need arises.

Figure 34:
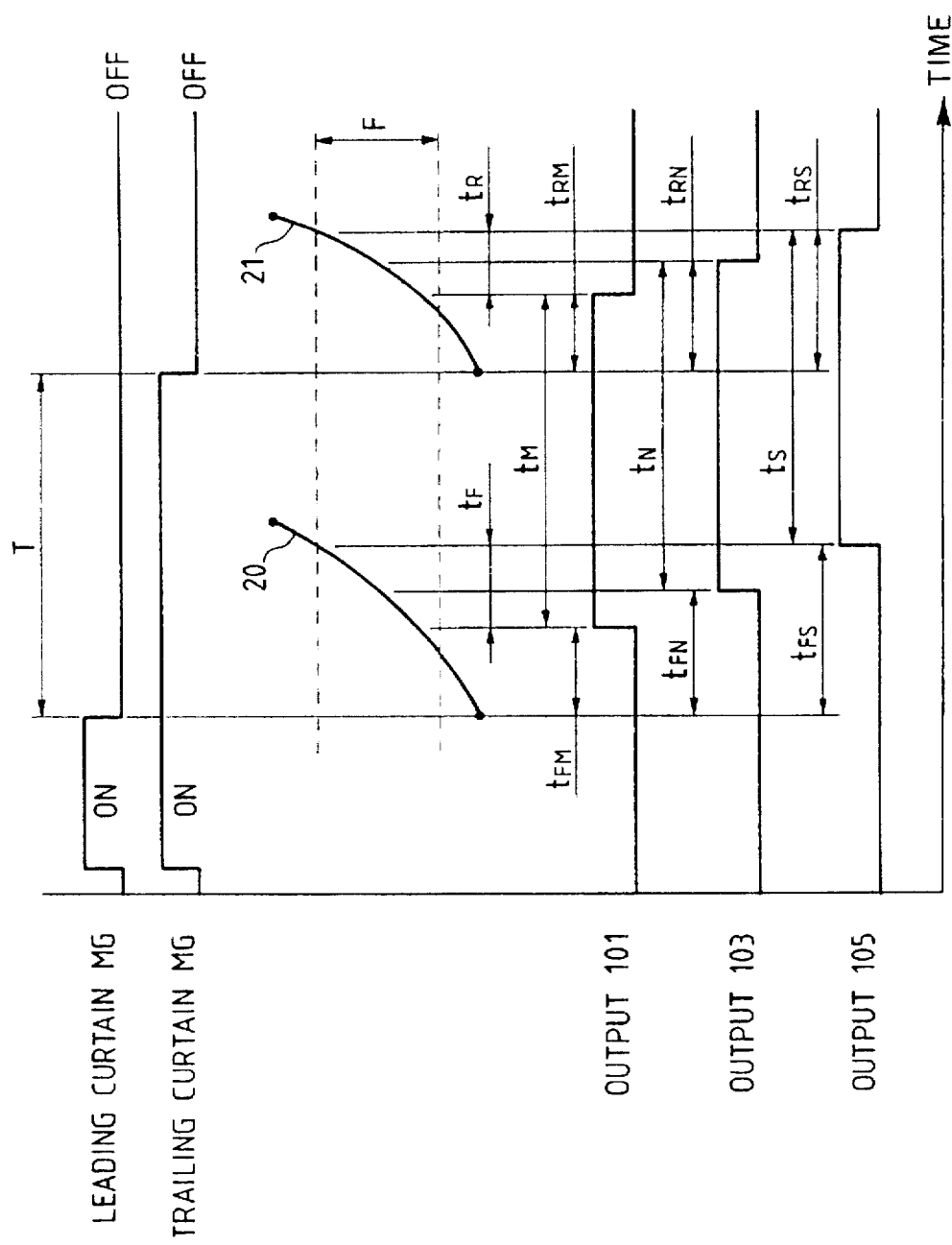
FIG. 34 is a timing chart showing an example of timings in the shutter measuring apparatus.

FIG. 34 is a timing chart of a variety of signals obtained from the above construction but shows tripping states of the leading/trailing curtains that vary depending on on/off timings of the control leading/trailing curtain magnets (MGs) and variations in the detection signals through the PTRs 101, 103, 105.

The leading/trailing curtain magnets are electrified and turned on with a depression of the unillustrated release button, thus starting electric securing of the respective curtains. Thereafter, stop-control of the lens 2 is at first executed with an action of an unillustrated mechanism. The reflecting mirror on the photographing light path then flips up therefrom. Subsequently, the leading curtain magnet is at first turned off. The leading curtain 16 is thereby tripped as depicted by a tripping curve 20. A symbol F herein designates an opening of the aperture 6. The leading curtain 16 passes through the above-mentioned detecting element midways of its tripping. Outputs of the PTRs 101, 103, 105 are therefore, as shown in the FIGURE, sequentially inverted to an H level as seen in the rise 22 explained in FIG. 3. Thereafter, the trailing curtain magnet is turned off after the preset time T defined as control exposure time has elapsed. The trailing curtain 15 thus moves across the opening F as depicted by a tripping curve 21. At this time also, the trailing curtain 15 passes through the detection element. The outputs of the PTRs 101, 103, 105 are sequentially restored to an L level of the original value as seen in the fall 23 explained in FIG. 3.

Hereat, the CPU 32 measures a time from the turn-off of the leading curtain magnet to the inversion of each of the PTRs 101, 103, 105 to the H level. These times are expressed by tFM, tFN, tFS, respectively. Similarly, the CPU 32 measures a measurement time of the turn-off of the trailing curtain magnet to the restoration of each of the PTRs 101, 103, 105. These times are expressed by tRM, tRN, tRS, respectively.

Then, the following calculation is conducted based on the control exposure time T. Individual actual exposure times tM, tN, tS in the "proximal part", the "mid-part" and the "distal part" are thereby obtained.

$$tM=T+tRM-tFM$$

$$tN=T+tRN-tFN$$

$$tS=T+tRS-tFS$$

Obtained further by the following formulae are timing intervals at which the leading curtain 16 and the trailing curtain 15 individually pass through the PTRs 101, 105, i.e., a leading curtain tripping time tF and a trailing curtain tripping time tR.

$$tF=tFS-tFM$$

$$tR=tRS-tRM$$

Figure 35:
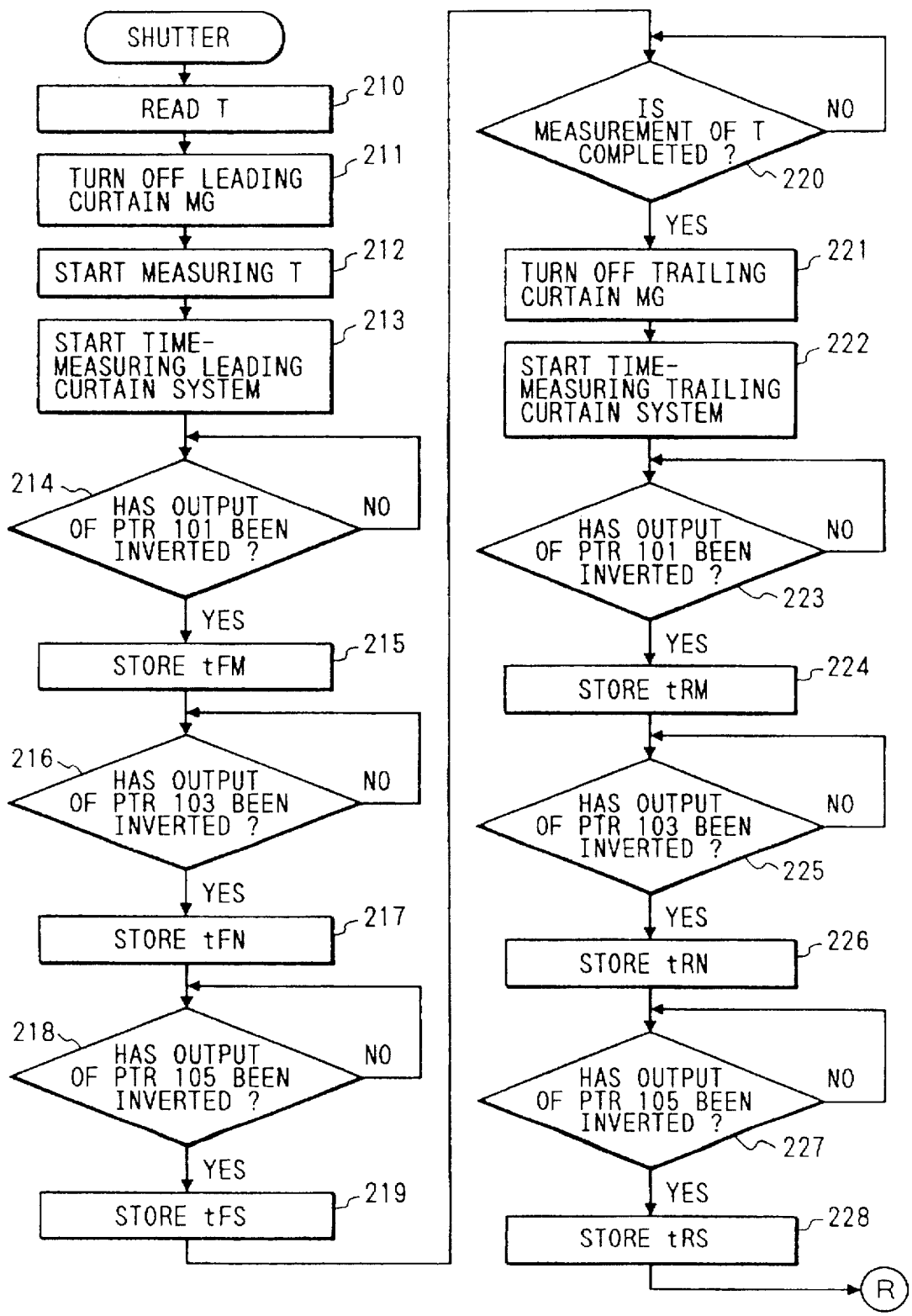
FIG. 35 is a flowchart showing an example of measurement processing of the shutter.
Figure 36:
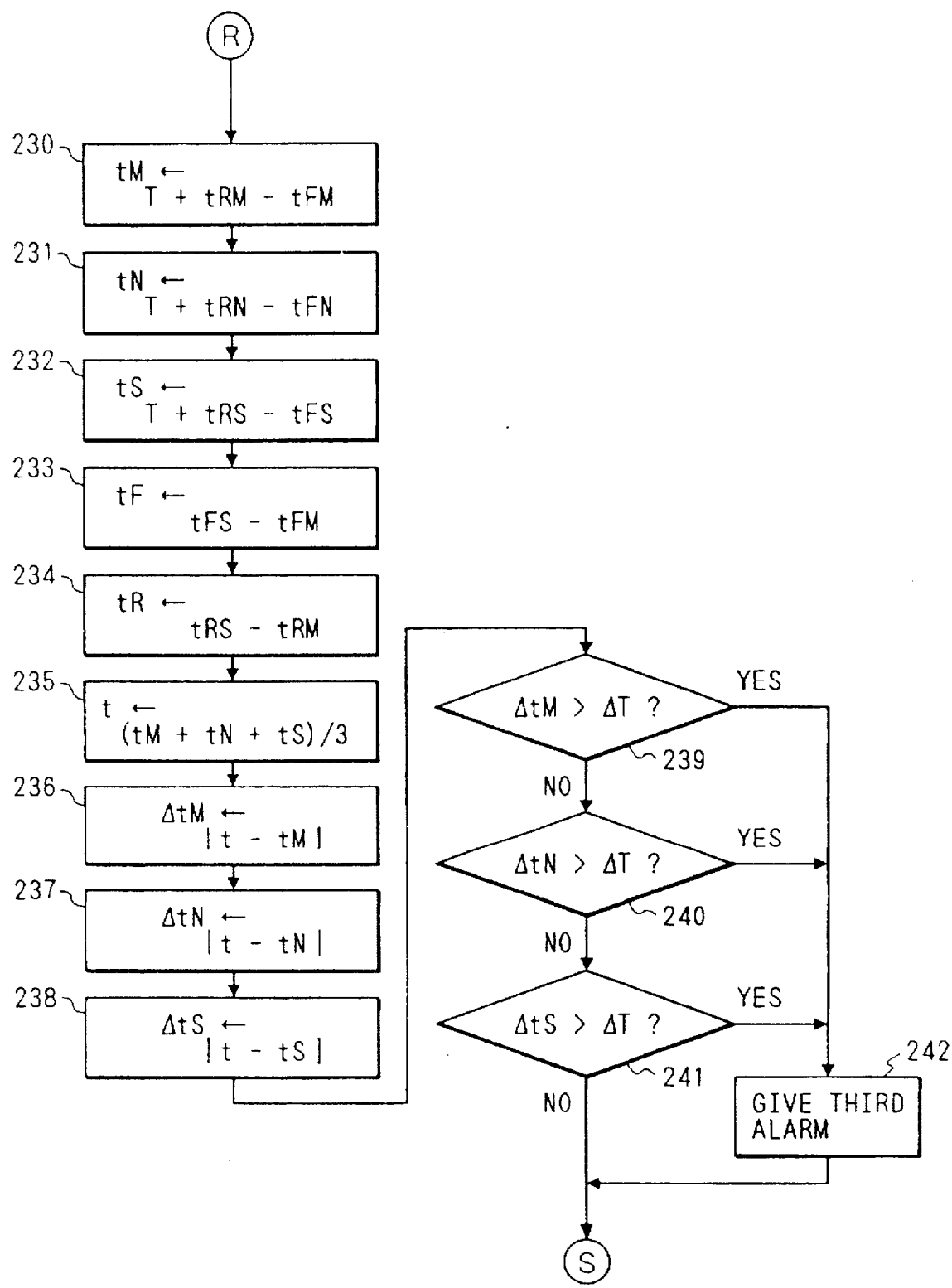
FIG. 36 is a flowchart showing an example of measurement processing of the shutter.
Figure 37:
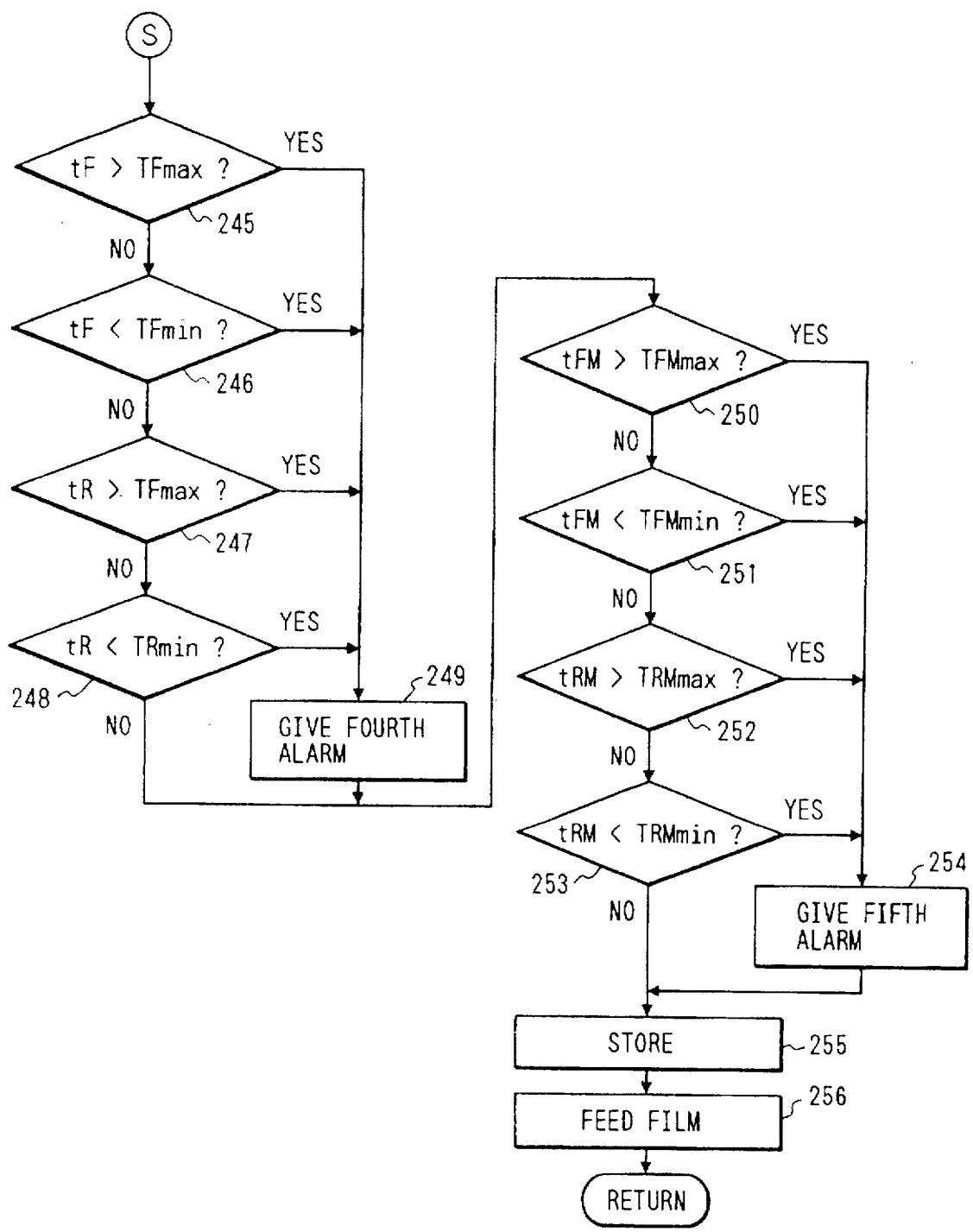
FIG. 37 is a flowchart showing an example of measurement processing of the shutter.

FIGS. 35 to 37 show examples of the processing routine of the CPU 32 in FIG. 33. This routine corresponds to the detailed processes such as S11 of FIG. 6. The symbol "S" before each reference numeral represents a step in the processing routine flow charts illustrated in FIGS. 35–37.

S210: The control shutter speed T is read.

S211: The leading curtain 16 starts tripping with a turn-off of the leading curtain magnet.

S212: Counting the control shutter speed T is started.

S213: Simultaneously, counting relative to the trip of the leading curtain 16 is started.

S214: To begin with, an inversion of the output of the PTR 101 is awaited.

S215: Stored is a counting result tFM obtained as a consequence of the inverted output of the PTR 101.

S216: An inversion of the output of the PTR 103 is awaited.

S217: Stored is a counting result tFN obtained as a consequence of the inverted output of the PTR 103.

S218: An inversion of the output of the PTR 105 is awaited.

S219: Stored is a counting result tFS obtained as a consequence of the inverted output of the PTR 105.

S220: An end of counting the control shutter speed T is awaited.

S221: The trailing curtain 15 starts tripping with a turn-off of the trailing curtain magnet.

S222: Started simultaneously is counting relative to the trip of the trailing curtain 15.

S223: An inversion of the output of the PTR 101 is awaited.

S224: Stored is a counting result tRM obtained as a consequence of the inverted output of the PTR 101.

S225: The inversion of the output of the PTR 103 is awaited.

S226: Stored is a counting result tRN obtained as a consequence of the inverted output of the PTR 103.

S227: The inversion of the output of the PTR 105 is awaited.

S228: Stored is a counting result tRS obtained as a consequence of the inverted output of the PTR 105.

S230: The exposure time tM of the "proximal part" is obtained from calculations with respect to the control time T, the counting time tRM and the counting time tFM.

S231: The exposure time tN in the "mid-part" is obtained from the calculations with respect to the control time T, the counting time tRN and the counting time tFN.

S232: The exposure time tS in the "distal part" is obtained from the calculations with respect to the control time T, the counting time tRS and the counting time tFS.

S233: The tripping time tF of the leading curtain 16 is obtained from the calculations with respect to the counting time tFS and the counting time tFM.

S234: The tripping time tR of the trailing curtain 15 is obtained from the calculations with respect to the counting time tRS and the counting time tRM.

S235: An average measurement time t is obtained by arithmetically averaging the above exposure times tM, tN, tS.

S236: Obtained is an absolute value ΔtM of a difference between the average measurement time t and the exposure time tM in the "proximal part".

S237: Obtained is an absolute value ΔtN of a difference between the average measurement time t and the exposure time tN in the "mid-part".

S238: Obtained is an absolute value ΔtS of a difference between the average measurement time t and the exposure time tS in the "distal part".

S239: Whether ΔtM, i.e., an unevenness in the "proximal part", exceeds an allowable value ΔT is determined. If over, the action proceeds to S242. Whereas if not, the action proceeds to S240.

S240: Whether ΔtN, i.e., an uneveness in the "midpart", exceeds the allowable value ΔT is determined. If over, the action proceeds to S242. Whereas if not, the action proceeds to S241.

S239: Whether ΔtS, i.e., an uneveness in the "distal part", exceeds the allowable value ΔT is determined. If over, the action proceeds to S242. Whereas if not, the action proceeds to S245.

S242: An alarm is given because any one of the unevennesses ΔtM, ΔtN, ΔtS in the respective parts exceeds the allowable value ΔT, i.e., the uneveness in the exposure time exceeds the limit. This is a phenomenon to induce a partial uneveness in the quantity of exposure on the film due to inconstant tripping times of the two curtains of the shutter 8. The alarm herein is to notify that the uneveness in the exposure time exceeds the allowable limit by flashing the segment 43 as explained in FIG. 5.

S245: Whether or not the leading curtain tripping time tF is equal to or greater than an allowable value TFmax is determined. If over, the action proceeds to S249. Whereas if not, the action proceeds to S246.

S246: Whether or not the leading curtain tripping time tF is equal to or smaller than an allowable value TFmin is determined. If under, the action proceeds to S249. Whereas if not, the action proceeds to S247.

S247: Whether or not the trailing curtain tripping time tR is equal to or greater than an allowable value TRmax is determined. If over, the action proceeds to S249. Whereas if not, the action proceeds to S248.

S248: Whether or not the trailing curtain tripping time tR is equal to or smaller than an allowable value TRmin is determined. If under, the action proceeds to S249. Whereas if not, the action proceeds to S250.

S249: The tripping time of the leading or trailing curtain exceeds the allowable value, and consequently the alarm is given. The alarm herein is, unlike S242, an abnormal alarm for the curtain tripping time. The excess of the tripping time over the limit implies that the blades of each curtain undergo a mechanical fluctuation. This may be a symptom of eventually leading to a damage of the curtain.

S250: Determined is whether or not a picture reaching time tFM of the leading curtain 16 is equal to or greater than an allowable value TFmax. If over, the action proceeds to S254. Whereas if not, the action proceeds to S251.

S251: Determined is whether or not the picture reaching time tFM of the leading curtain 16 is equal to or smaller than an allowable value TFmin. If under, the action proceeds to S254. Whereas if not, the action proceeds to S252. It is feasible to detect the abnormality in the mechanical tripping system of the leading curtain by counting a preparatory tripping time after turning off the leading curtain magnet in combination with S250.

S252: Determined is whether or not a picture reaching time tRM of the tailing curtain 15 is equal to or greater than an allowable value TRmax. If over, the action proceeds to S254. Whereas if not, the action proceeds to S253.

S253: Determined is whether or not the picture reaching time tRM of the tailing curtain 15 is equal to or smaller than an allowable value TRmin. If under, the action proceeds to S254. Whereas if not, the action proceeds to S255. It is possible to detect the abnormality in the mechanical tripping system of the trailing curtain by counting the preparatory tripping time after turning off the trailing curtain magnet in combination with S252.

S254: The preparatory tripping time of the leading or trailing curtain exceeds the allowable value, and consequently the alarm is given. The alarm herein is, unlike either S242 or S249, an abnormal alarm of the preparatory tripping time. If in excess of the limit, this eventually leads to an accident in which the curtain can not be closed or reversely opened.

S255: The above measured and determined results are stored in the memory 110.

S256: One frame of the film is wound up, and the action returns to S1 of FIG. 6.

According to the present invention, the shutter measuring apparatus has the opening which admits the transmission of the photographing light to the recording medium loaded in the camera. The shutter measuring apparatus comprises the shutter element capable of operating the light intercepting state of intercepting the transmission of the photographing light through the opening and the transmitting state of admitting the transmission thereof. The shutter measuring apparatus also comprises the shutter control element for controlling the operation of the shutter element and the shutter driving element for driving the shutter element. The shutter measuring apparatus further comprises the shutter detecting element for detecting the operating state of the shutter element. It is therefore possible to detect the operating state of the shutter.

As discussed above, according to the present invention, as described in FIGS. 13–15, the shutter measuring apparatus has the opening which admits the transmission of the photographing light to the recording medium loaded in the camera. The shutter measuring apparatus comprises the shutter element capable of operating the light intercepting state of intercepting the transmission of the photographing light through the opening and the transmitting state of admitting the transmission thereof. The shutter measuring apparatus also comprises the first and second shutter control elements for controlling the operations of the shutter element and the selecting element for selecting any one of the first and second shutter control elements. The shutter measuring apparatus further comprises the first shutter driving element for driving the shutter element in accordance with the control by the first shutter control element and the second shutter driving element for driving the shutter element in accordance with the control by the second shutter control element. The shutter measuring apparatus still further comprises the shutter detecting element for detecting the operating state of the shutter element through the second shutter driving element. Accordingly, there is no need for operating the camera absolutely in the same sequence as that of the normal photography when detecting the operating state of the shutter. This eliminates the unnecessary operations, resulting in such an effect that the detecting action can be performed quickly.

As explained above, according to the present invention, as described in FIGS. 16 to 19, the shutter measuring apparatus has the opening which admits the transmission of the photographing light to the recording medium loaded in the camera. The shutter measuring apparatus comprises the shutter element capable of operating the light intercepting state of intercepting the transmission of the photographing light through the opening and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the shutter detecting element for detecting the operating state of the shutter element and the condition-of-use detecting element for detecting a condition of use of the camera. The shutter measuring apparatus still further comprises the detection control element for making the shutter detecting element active in accordance with the output of the condition-of-use detecting element. Therefore, the detection of the operating state of the shutter does not get active each time shooting takes place. There is obtained such a effect that the detection is executed for the first time at a stage of reaching the predetermined condition of use. As described above, according to the present invention, the shutter measuring apparatus has the opening which admits the transmission of the photographing light to the recording medium loaded in the camera.

The shutter measuring apparatus comprises the shutter element capable of operating the light intercepting state of intercepting the transmission of the photographing light through the opening and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the photo detecting element for detecting the operating state of the shutter with the object light serving as a light source.

Hence, there can be utilized the object light naturally irradiated via the lens on the occasion of shooting. This eliminates the necessity for specially preparing the light source in the camera. There are attained down-sizing of the apparatus and an energy saving effect.

As discussed above, according to the present invention, as illustrated in FIG. 27, the shutter measuring apparatus has the opening which admits the transmission of the photographing light to the recording medium loaded in the camera. The shutter measuring apparatus comprises the shutter element capable of operating the light intercepting state of intercepting the transmission of the photographing light through the opening and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the photo detecting element for detecting the operating state of the shutter with the object light serving as a light source and the shutter detecting element for detecting the operating state of the shutter element with a variable detected photographic speed. It is therefore possible to set the detected photographic speed under the optimum condition according to the necessity.

As explained above, according to the present invention, as illustrated in FIGS. 30–31, the shutter measuring apparatus has the opening which admits the transmission of the photographing light to the recording medium loaded in the camera. The shutter measuring apparatus comprises the shutter element capable of operating the light intercepting state of intercepting the transmission of the photographing light through the opening and the transmitting state of admitting the transmission thereof. The shutter measuring apparatus also comprises the shutter control element for controlling the operation of the shutter element and the shutter driving element for driving the shutter element in accordance with the control by the shutter control element. The shutter measuring apparatus further comprises the shutter detecting element for detecting the operating state of the shutter element and outputting the operating state in the form of the pulse signal and the storage element for storing the pulse signal as an analog-converted signal. The determination thereof can be done by the AD converting function. There is no need for providing the precise counting mechanism for counting the rises and falls of the pulse signals.

It is apparent that, in this invention, a wide range of different working modes can be formed based on the invention without deviating from the spirit and scope of the invention. This invention is not restricted by its specific working modes except being limited by the appended claims.

What is claimed is:

1. A camera having a shutter measuring apparatus, comprising:

a shutter device having shutter blades to make an aperture portion openable and closable with said shutter blades, said shutter device being changeable to a transmitting state of admitting a transmission object light through said aperture portion and to an intercepting state of intercepting the transmission thereof;

a driving mechanism to cause said shutter blades to open and close said aperture portion by driving said shutter device; and a detecting device, having a light projecting element to project the light toward said shutter device and a light receiving element to receive the projected light reflected from said shutter device, said light projecting element and said light receiving element being provided on a same side in relation to the shutter blades, to detect an operating state of said shutter device when driven by said driving mechanism on the basis of an output of said light receiving element.

2. A camera having a shutter measuring apparatus, comprising:

a shutter which makes an aperture portion openable and closable, said shutter being changeable to a transmitting state of admitting a transmission object light through said aperture portion and to an intercepting state of intercepting the transmission thereof;

a driver which causes said shutter to open and close aperture portion by driving said shutter;

a measuring unit which measures a state-of-transmission time of said shutter when driven by said driver;

a setting unit which sets a time for which said shutter is to be in the transmitting state; and an inhibiting unit which is electrically connected to said setting unit and said measuring unit, and which inhibits an operation of said measuring unit if the time set by said setting unit is longer than a predetermined time.

3. The camera according to claim 2, wherein said measuring unit comprises:

a light projecting element which projects the light on said shutter; and a light receiving element which receives the light projected from said light projecting element, wherein said inhibiting unit inhibits the projection of light by said light projecting element if the set time is longer than the predetermined time.

4. The camera according to claim 3, wherein said light projecting element is an LED.

5. A camera having a shutter measuring apparatus, comprising:

a shutter device having shutter blades to make an aperture portion openable and closable with said shutter blades, said shutter device being changeable to a transmitting state of admitting a transmission object light through said aperture portion and to an intercepting state of intercepting the transmission thereof;

a driving mechanism to cause said shutter blades to open and close said aperture portion by driving said shutter device; and a detecting device, having plural pairs of light projecting elements to project the light toward said shutter device and light receiving elements to receive the light reflected from said shutter device, said plural pairs of light projecting elements and light receiving elements being provided on a same side in relation to said shutter blades, to detect an operating state of said shutter device when driven by said driving mechanism on the basis of outputs of said plurality of light receiving elements.

6. The camera according to claim 5, wherein said detecting device measures a state-of-transmission time of said shutter device when driven by said driving mechanism.

7. The camera according to claim 5, wherein said plural pairs of light projecting and receiving elements are provided in positions corresponding to upper, middle and lower parts of said aperture portion.

8. The camera according to claim 7, wherein said shutter device is constructed of a leading blade-set and a trailing blade-set, and said camera further comprises a calculating circuit to calculate a tripping time of said leading blade-set through said aperture portion and a tripping time of said trailing blade-set through said aperture portion on the basis of outputs of said plurality of light receiving elements.

9. The camera according to claim 8, further comprising:

an alarming device to provide an alarm if the calculated leading blade tripping time or the calculated trailing blade tripping time is out of a range of predetermined time.

10. The camera according to claim 8, further comprising:

a comparing circuit to compare the leading blade tripping time calculated by said calculating circuit with the trailing blade tripping time calculated by said calculating circuit and determining whether the two tripping times are uniform or not; and an alarming device to provide an alarm when said comparing circuit determines that the two tripping times are ununiform.

11. The camera according to claim 5, wherein said shutter device is constructed of a leading blade-set and a trailing blade-set, said driving mechanism contains an electromagnetic member for starting the trip of each of the two blade-sets, and said one pair of light projecting element and light receiving element in said detecting device detect a time for which said shutter device opens and closes an upper edge of said aperture portion, and wherein said camera further comprises a mechanical state detecting device to detect a time between a start of tripping of said blade-set by said electromagnetic member and a reach to the upper edge of said aperture portion and determining whether or not the detected time is out of the range of predetermined time; and an alarming device to provide an alarm when said mechanical state detecting device detects that the detected time is out of the range of predetermined time.

12. A method of detecting a shutter driving state of a camera, comprising the steps of:

driving a shutter having shutter blades by a shutter driving mechanism and causing said shutter to open and close an aperture portion on a shutter base with said shutter blades;

changing over said shutter to a transmitting state of admitting a transmission of object light through said aperture portion and to a light intercepting state of intercepting the transmission thereof by opening and closing said aperture portion;

projecting light toward said shutter; and measuring a state-of-transmission time of said shutter when driven by said shutter driving mechanism by receiving the light reflected from said shutter, wherein the light is projected from and received on a same side in relation to said shutter blades.

13. A method of detecting a shutter driving state of a camera, comprising the steps of:

driving a shutter by a shutter driving mechanism and causing said shutter to open and close an aperture portion on a shutter base;

changing over said shutter to a transmitting state of admitting a transmission of object light through said aperture portion and to a light intercepting state of intercepting the transmission thereof by opening and closing said aperture portion;

setting a time for which said shutter is to be in the transmitting state; and inhibiting a measuring action of a state-of-transmission of said shutter when driven by said shutter driving mechanism if the set time is longer than a predetermined time.

14. A method of detecting a shutter driving state of a camera, comprising the steps of:

driving a shutter having shutter blades by a shutter driving mechanism and causing said shutter to open and close an aperture portion on a shutter base with said shutter blades;

changing over said shutter to a transmitting state of admitting a transmission of object light through said aperture portion and to a light intercepting state of intercepting the transmission thereof by opening and closing said aperture portion;

projecting the light toward said shutter through a plurality of light projecting elements; and measuring a state-of-transmission time of said shutter when driven by the shutter driving mechanism in accordance with outputs of light receiving elements respectively corresponding to said light projecting elements, wherein said light projecting elements and said light receiving are provided on a same side in relation to said shutter blades.

* * * * *